(12) United States Patent
Tabellion et al.

(10) Patent No.: US 7,243,094 B2
(45) Date of Patent: Jul. 10, 2007

(54) METHOD AND SYSTEM FOR INTELLIGENT STORAGE MANAGEMENT

(75) Inventors: Nicholas Tabellion, San Jose, CA (US); Robert Gagnon, Lachanaie (CA); Martin Pare, Mirabel (CA); Guy Letourneau, Boucherville (CA); Heidi Schoolcraft, San Jose, CA (US); James Thomson, Moorpork, CA (US); John Dunning, Belmont, CA (US); Steven Calde, San Jose, CA (US); Michael Kay, Hollister, CA (US)

(73) Assignee: Softek Storage Solutions Corporation, Sunnyvale, CA (US)

( * ) Notice: Subject to any disclaimer, the term of this patent is extended or adjusted under 35 U.S.C. 154(b) by 424 days.

(21) Appl. No.: 10/449,955

(22) Filed: May 30, 2003

(65) Prior Publication Data

US 2004/0098383 A1    May 20, 2004

Related U.S. Application Data

(60) Provisional application No. 60/384,577, filed on May 31, 2002.

(51) Int. Cl.
*G06F 17/30* (2006.01)
(52) U.S. Cl. ............................. 707/3; 707/10
(58) Field of Classification Search .............. 707/1–10, 707/100–104.1, 200–206; 345/102; 709/232
See application file for complete search history.

(56) References Cited

U.S. PATENT DOCUMENTS

| | | | |
|---|---|---|---|
| 4,642,803 A | 2/1987 | Drexler | |
| 5,018,060 A | 5/1991 | Gelb et al. | |
| 5,327,156 A | 7/1994 | Masukane et al. | |
| 5,467,558 A | 11/1995 | Kober et al. | |
| 5,594,924 A | 1/1997 | Ottesen et al. | |
| 5,619,696 A | 4/1997 | Nakagawa | |
| 5,630,104 A | 5/1997 | Ottesen et al. | |
| 5,732,215 A | 3/1998 | Boutaghou et al. | |
| 5,761,007 A | 6/1998 | Price et al. | |
| 5,923,864 A | 7/1999 | Inoue | |
| 5,960,169 A | 9/1999 | Styczinski | |
| 5,974,085 A | 10/1999 | Smith | |
| 6,075,665 A | 6/2000 | Chainer et al. | |
| 6,105,103 A | 8/2000 | Courtright, II et al. | |
| 6,535,891 B1 | 3/2003 | Fisher et al. | |
| 6,571,310 B1 | 5/2003 | Ottesen et al. | |
| 2002/0049749 A1* | 4/2002 | Helgeson et al. | 707/3 |
| 2002/0073080 A1* | 6/2002 | Lipkin | 707/3 |

OTHER PUBLICATIONS

International Search Report, Sep. 24, 2003, PCT/US03/17322.

* cited by examiner

*Primary Examiner*—Diane Mizrahi
(74) *Attorney, Agent, or Firm*—Kenyon & Kenyon LLP

(57) ABSTRACT

A storage management system is provided. The storage management system may includes a data collector configured to receive storage management information for storage. The storage manager includes an agent configured to collect storage management information for a storage object and to communicate the storage management information to the data collector. The storage management system includes a user interface configured to display the storage management information for the storage objects.

53 Claims, 36 Drawing Sheets

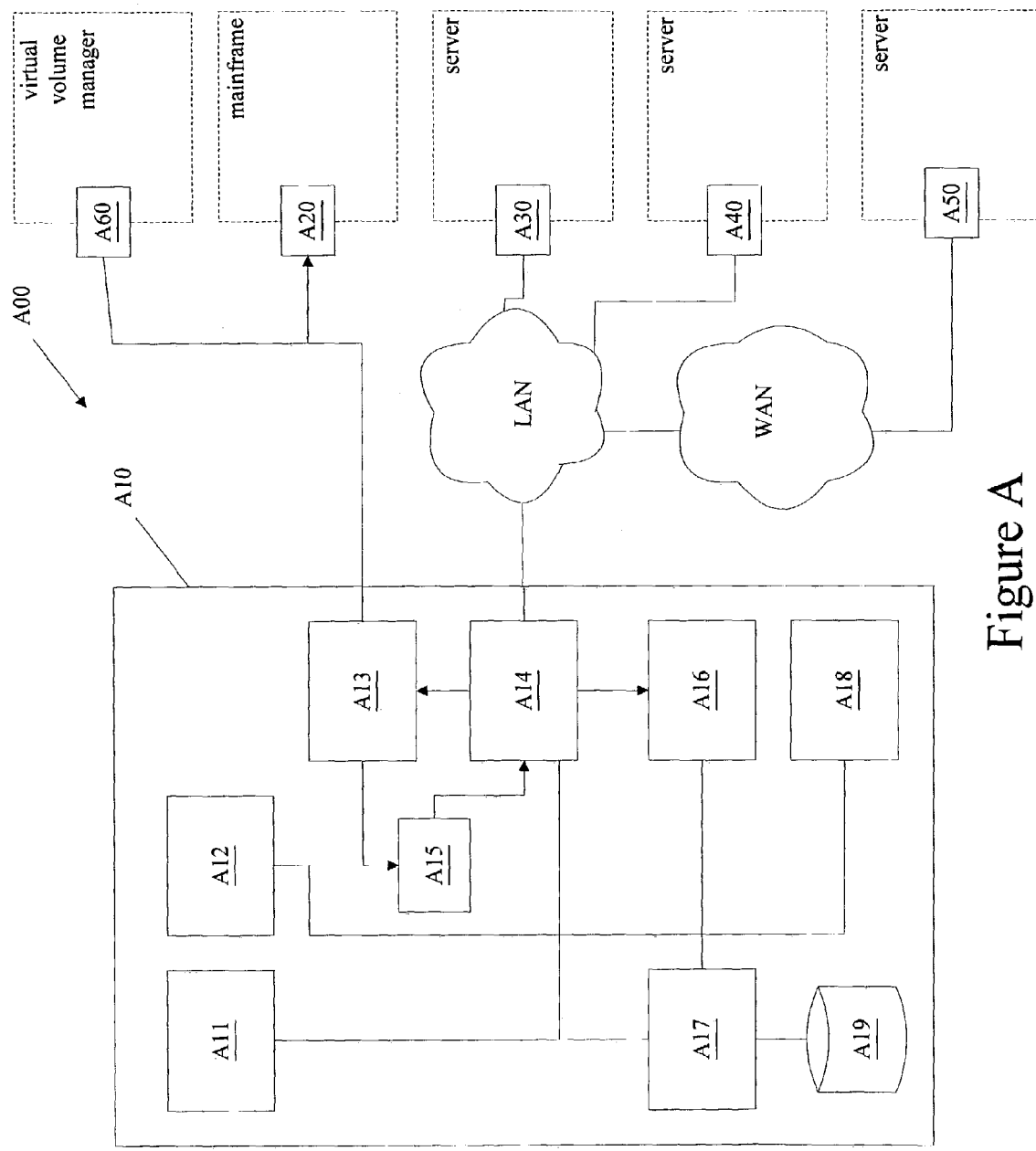
Figure A

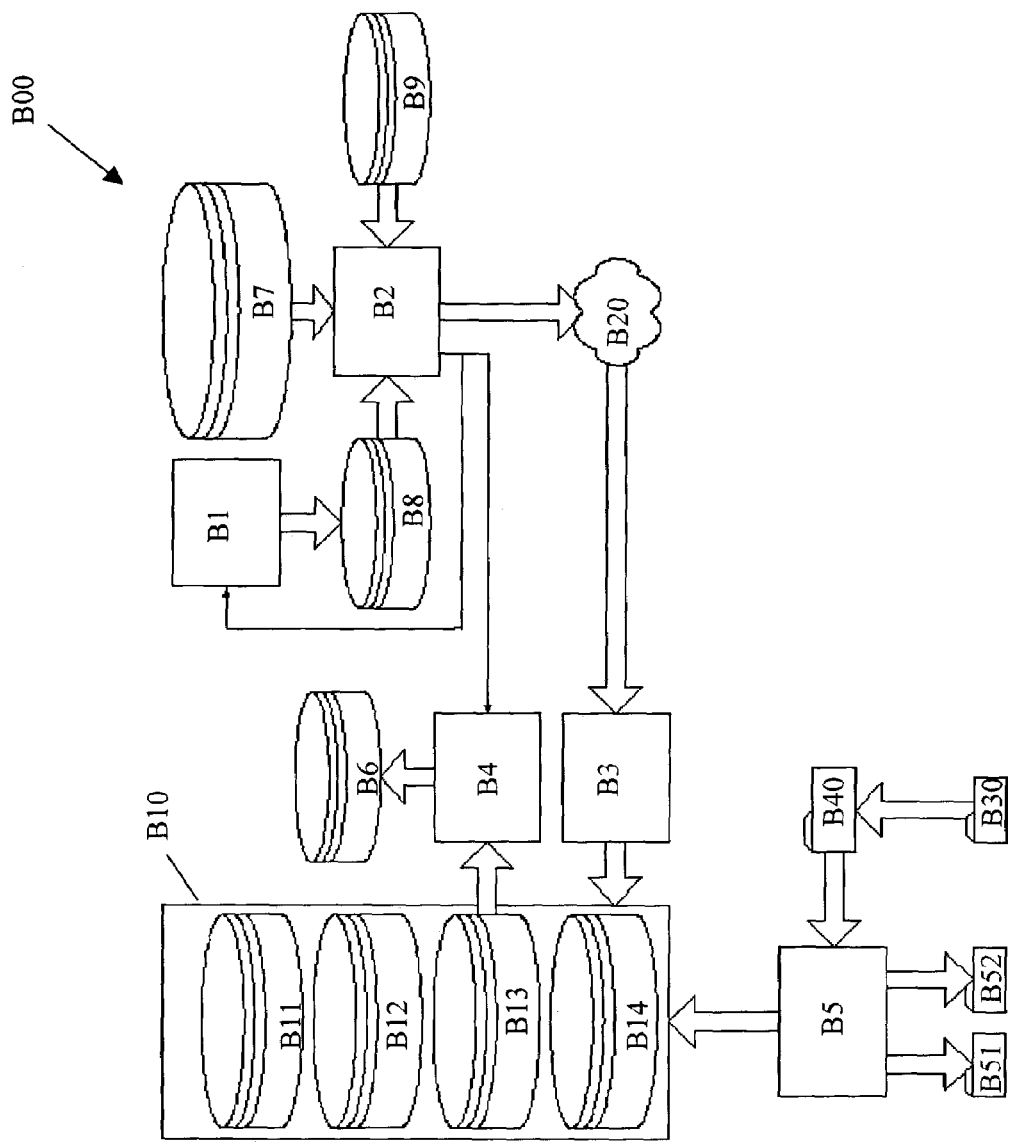
Figure B

Figure 9

```
' This Policy checks the disk usage of the AdminServer, if it exceeds
' 75%, then it sends an email to the manager of the AdminServer.
Dim Server
Dim PercentUsage ' Get the administration server
Set Server = Servers.Item("AdminServer")

' Evaluate the total capacity usage.  This is the policy
PercentUsage = (Server.FileSystems.Used) / Server.FileSystems.Capacity * 100

' If we exceed 75%, send an email to the manager...
If PercentUsage > 75 then
      This is the action
   Server.Manager.SendEmail "Disk Usage exceed 75%",
         "This is an automated email, ....."
Endif
```

```
' This policy archives and erases all files located on the file server named
'   Titan that are bigger than 10,000 bytes and
'   have not been accessed in the last year.
Dim Server
Dim Filter
Dim Files ' Get the Titan server
Set Server = Servers.Item("Titan")

' Create a file system object filer "IFileSystemObjectFilter"
' an initialize it to get
'       all FILES
'       greater than 10000 bytes
'       last accessed more than a year ago.
Set Filter = CreateObject("SoftekSpaceManager.FileSystemObjectFilter")
Filter.Type = SSM_FILE
Filter.SizeGreaterThan = 10000
Filter.LastAccessBefore = Now()-365

' Get the files
Set Files = Server.GetItems ( Filter )

' Delete the files.
Files.Delete
```

```
This policy erases all files with the jpg extension (*.jpg) on file systems
that have less than 20% disk space left.

Create and initialize a filter
Dim Filter
Set Filter = CreateObject("SoftekSpaceManager.FileSystemObjectFilter")
Filter.Type = SSM_FILE
Filter.Name = "*.jpg"

Iterate through the list of servers
Dim Server
Dim Files
For Each Server in Servers
    if Server.PercentFree < 20 then
        ' Get the files
        Set Files = Server.GetItems ( Filter )
        Files.Delete
    end if
Next Server
```

METHOD AND SYSTEM FOR INTELLIGENT STORAGE MANAGEMENT

CROSS REFERENCE TO RELATED APPLICATION

This application claims the benefit of and priority to U.S. Provisional Application No. 60/384,577, filed May 31, 2002, the disclosure of which is incorporated by reference in its entirety.

A portion of the disclosure of this patent document contains material which is subject to copyright protection. The copyright owner has no objection to the facsimile reproduction by anyone of the patent document or patent disclosure as it appears in the patent and Trademark Office patent file or records, but otherwise reserves all copyrights whatsoever.

FIELD OF THE INVENTION

The present invention relates to a method and system for storage management.

BACKGROUND INFORMATION

Growth rates for storage consumption may increase for many types of applications. Enterprises may store huge amounts of data on multiple systems and networks, and on various media formats including disk, tape, and optical storage. Restrictions on computer system storage may even limit the launch of new business programs.

Storage and system administrators may wish to manage available storage for productive uses and not wasted on unproductive ones. Increasing the efficiency and effectiveness of storage or system administrators may be important. To manage storage efficiently, understanding how storage is used, as well as identifying where storage is being wasted, may be critical.

Storage and system administrators may desire a central view of computer storage resources and their usage. Depending on system requirements, they may desire tools for both for planning and for analysis and reporting, as well as for more operational tasks such as blocking improper usage of storage or alerting administrators to out-of-capacity conditions. Storage and systems administrators may desire combined storage and resource management functions to enhance their capabilities. For example, storage and system administrators may desire asset management (physical asset number, product serial number, installation data, location of equipment, warranty period, cost), capacity management (real-time and historical usage trends), charge-back (either with a formal charge-back function or some ad hoc reporting capabilities, e.g., cost accounting), data migration (movement of data across the enterprise, including backup and restore solutions), event management (alerting and logging of events), media management (tracking removable media both on-site and off-site). Other desirable functions may include some form of quota enforcement, which may be complex across multiple operating systems, as well as some way to measure storage performance.

Storage and system administrators may also wish to have the ability to generate reports that may be run, for example, either on a one-time basis or on a schedule, and that provide a variety of ways of looking at storage usage at a given moment as well as trends over time. System and storage administrators may also need special software to implement policy-based management. The use of policies, or rules-based actions, may significantly extend the amount of storage one administrator may manage.

System and storage administrators may also need a storage management system to support a variety of platforms or operating systems, e.g., a Windows-only environment, an open systems environment such as UNIX, and/or a mainframe computer system.

BRIEF DESCRIPTION OF THE DRAWINGS

FIG. A illustrates an example storage management system, according to an example embodiment of the present invention.

FIG. B illustrates an example database schema, according to an example embodiment of the present invention.

FIG. 9 illustrates an example table view display of the visualizer area of the storage management system screen of FIG. 1.

FIG. 17 shows an example policy for managing disk space of a server and alerting the system administrator upon exceeding a threshold of disk usage.

FIG. 18 shows an example policy for archiving and erasing all files located on a named file server that are larger than a certain size and not accessed within a certain time period.

FIG. 19 shows an example policy for deleting files of a certain type on file systems with less than a certain amount of disk space left.

DETAILED DESCRIPTION OF EXAMPLE EMBODIMENTS

Figure 1:
FIG. 1 illustrates an example storage management system screen, according to an example embodiment of the present invention.

FIG. A illustrates an example storage management system A00, according to an example embodiment of the present invention. The storage management system A00 may be used for collecting information on, as well as managing storage objects. A storage object may include, for example, a file, a file system, or a server. These storage objects may be centralized on a single server, or distributed across a network.

The storage management system A00 may include a storage management server A10 arranged to communicate with a mainframe agent A20, a first space agent A30, a second space agent A40, a third space agent A50, and a virtual volume manager A60. It will be appreciated that an agent may be provided for each system server (or for possible group of systems which have their storage managed by the storage management system. The storage manager server A10 may also include a user interface A11, an policy/action set editor A12, a mainframe gateway A13, a data collector A14, an input directory A15, a reporter A16, an SQL server A17, an policy/action set engine A18, and a database A19.

The data collector A14 may direct interaction between the storage management server A10 and the agents A20, A30, A40, A50. In particular, the data collector A14 may receive storage management information gathered by the agents A20, A30, A40, A50 store the information in the database A19, initiate storage management information collection schedules, direct the execution of actions and monitor their status. The data collector A14 may also update reporting tables for use by the reporter A16, monitor the information stored in the database A19, e.g., periodically erasing old data so that the size of the database A19 may be maintained. The data collector A14 may run as a background program, with or without input from the user interface A11, thereby provide a flexible platform for coordinating storage management functions.

The data collector A14 may utilize an intermediary to communicate with an agent. For example, the data collector may communicate with the mainframe agent A20 via the mainframe gateway A13. An instance of the mainframe gateway A13 may be created (e.g., launched as a process) each time the capacity or file information of a file system storage object of the mainframe agent A20 is updated (e.g., when a capacity update or a file data update occurs). Upon being launched, the mainframe gateway A13 may receive storage management information from the mainframe agent A20, generate an internal file, and subsequently terminate. The mainframe gateway A13 may also communicate with the virtual volume manager A60 which may provide information regarding the present volume(s) without the need to understand underlying hardware implementation/details.

The agents A20, A30, A40, may collect storage management information and communicate it to the data collector A14. The agents A20, A30, A40 may be background processes residing on an associated server. Alternatively there may be a single agent for a group of servers, e.g., a particular geographic location in a widely distributed storage system. For example, the first space agent A30 and the second space agent A40 may be background processes resident on a first monitored server and a second monitored server, respectively, which spawn automatically during the boot server process. The first monitored server may support UNIX-based environment such as HP-UX 11, while the second monitored environment may support a WINDOWS-based environment such as Windows NT 4 and Windows 2000. Other agents may be provided for other operating systems, e.g., Solaris 7, Solaris 8, and AIX 4.3.

At startup, the agents A20, A30, A40 may establish a connection to the data collector A14, send initial information regarding the current capacity of resident storage objects, and wait to receive commands from the data collector A14. The commands may direct the agents A20, A30, A40 to perform a variety of tasks or actions. For example, the commands may direct the space agent to scan the server for a particular storage object (e.g., a particular file, file system, or server), to delete one or more storage objects, to archive one or more storage objects, to delete and then subsequently archive one or more storage objects, or to generate a report. When a command is issued, the result of the command, e.g., the command's state, may be stored in the database A19 of the storage management server A10. The database may be updated to preserve a record of state transitions. This record may be kept, for example, for a user-specified number of days so that a particular command's success or failure may be investigated at a later time.

The state of a command may include, for example, "pending", "communicating", "synchronizing", "done", "invalid", "error", or "timeout". In the pending state, the command may be awaiting to be sent by the data collector A14. In the communicating state, the command has been sent to an appropriate agent (e.g., the first space agent A30 or the second space agent A40) and the data collector A14 is awaiting a reply from the agent. In the synchronizing state, the data collector A14 may be processing the reply from the agent. In the done state, the data collector A14 has finished processing the reply from the agent and the reply indicates a successful completion of the command. In the invalid state, the data collector A14 had finished processing the reply from the agent and the reply indicates an unsuccessful completion of the command due to, for example, invalid command parameters. In the error state, the data collector A14 has finished processing the reply from the agent and the reply indicates an unsuccessful completion of the command, or alternatively, the error state reflects a fault or inconsistency encountered during the processing of the reply, due to, for example, an error detected in the reply packet. In the timeout state, the command has been sent to the agent but a reply has not been received by the data collector A14 within a predetermined time period indicating the expiring of the waiting period for command completion. When a timeout occurs, the command may be restarted (e.g., its state is set to "pending") and an attempt may be made to resend the command to the agent. The restart may be repeated for a pre-specified number of times, e.g., three, which if all unsuccessful may result in an error condition.

The user interface A11 may display storage management information gathered by the agents A20, A30, A40 and collected by the data collector A14. For example, the user interface A11 may display the size of file system, the amount of free space on a server, a file type (e.g., JPEG, BMP, GIF, TIF, etc.), or a time when a file was last accessed. The user interface A11 may also include a filter to selectively display a subset of the storage management information according to a predefined selection criterion. For example, the predefined selection criterion may include whether a file system exceeds a threshold percentage of capacity or whether a file exceeds a threshold size.

The user interface A11 may also allow a user (e.g., a system administrator) to interact with the storage management system A00. For example, the user interface A11 may also allow a user to request a real-time update of the storage management information. Upon such a request, the agents A20, A30, A40 may gather "fresh" storage management information and communicate it to the data collector A14. And upon receiving the fresh information, the user interface may display a "freshness" indicator providing a graphical and/or numeric representation of freshness.

The user interface A11 may allow a user to specify collection schedules, define action sets, and issue manual commands. The collection schedules may include a predetermined set of periodic times (e.g., daily, hourly, etc.) or a predetermined set time (e.g., 15:28 pm). The action sets may contain actions in the form of tasks to be carried out on a particular storage object or group of storage objects. Such tasks may include, for example, deleting a storage object, archiving a storage object, backing-up a storage object, compressing a storage object, or changing an attribute of a storage object (e.g., maximum allowed size of a file of a sign type). The policy/action set engine A18 evaluates the defined action set upon a capacity update or a file data update resulting in one or more actions, each of which may be recorded as one or more commands to be sent by the data collector A14.

The user interface A11 may include an action input interface to create, maintain, and remove actions. Alternatively, the user interface A11 may include a policy input interface. Policies may include a collection of action rules to allow the user to specify specific targets and conditions that determine where and when the actions are to be performed. For example, a policy may specify an action of deleting all files of a predetermined size that reside on a particular file server provided that they have not been accessed within the last year. Additionally, the policy may further specify that the delete action is to be performed at predetermined set of periodic times or when a threshold size or capacity has been reached.

The user interface A11 may also include a previewer to allow a user to preview an effect of the policy without have the effect of the policy take place. Such a previewer may generate, for example, a list of storage objects potentially affected by the policy along with a potential outcome indicator for each storage object.

The reporter A16 may use information stored by the data collector A14 in the database to produce reports (e.g. HTML reports). This reporting process or "bucket generation" may be controlled by a schedule. For example, at a predetermined time, the data collector A14 generates pre-processed information (e.g., buckets) which may be stored in the database. Upon completion of the collection, the data collector A14 launches the reporter A16 which may process the information to produce the reports.

The policy/action set editor A12 may edit policies and/or action sets. The policy/action set engine A18 may interrogate storage management information and execute one or more predefined actions. The policy action set engine A18 may also sort and/or categorize polies/actions. In this regard, an automatic action may be performed in a desired manner upon detection of a change in the storage management information. In particular, for example, a storage object, such as a file system, may be automatically expanding upon detection of a low resources condition.

FIG. B illustrates an example database schema B00, according to an example embodiment of the present invention. Data schema B00 may include a command scheduler B1, a database poller B2, a network interface B3, a bucket generator B4, and a file collector B5. The database schema B00 also includes a number of tables. In particular, the tables may include a bucket table B6, a data collector configuration table B7, a command execution table B8, a schedule table B9, and data acquisition tables B10. The data acquisition tables include a server table B11, a file system table B12, a file table B13, and a historical file system table B14.

The command scheduler B1 is configured to generate commands in the command execution table B8 to be later executed according to an appropriate schedule. The schedule may define execution at regularly scheduled times (e.g., four times a day at 10:00, 11:15, 15:28, and 22:59) and/or within a repeated interval (e.g., every 60 seconds). For example, a schedule may be defined to execute once per day at 15:28 and every 15 minutes.

Different schedules may be defined for different types of commands. For example, a file update schedule may be defined to execute file update commands, a capacity update schedule may be defined to execute capacity update commands, and a report generation schedule may be defined to execute report generation commands. Schedules may also be different for different managed storage, e.g., different servers, groups, departments, etc. File update and capacity update schedules may be defined on a per-server basis, while report generation schedules may be defined on a systemwide basis. The particulars of a schedule may be defined via the user interface A11 or they may be predetermined via system defaults.

The database poller B2 may be configured to detect new commands generated in the command execution table B8, and to initiate their execution according to appropriate schedule stored in the schedule table B9. The database poller may also be configured to detect changes made to the configuration table B7, and to propagate such changes to the appropriate entity.

The network interface B3 may be configured to interact with the network B20. For example, the network interface B3 may receive data packets from agents residing on the monitored servers and forwards them to the appropriate entity, e.g., the data collector A14. Should a communication channel fail between, for example, the agent and the data collector A14, the network interface may forward such storage management information to the communicating parties.

The bucket generator B6 may generate aggregated data collected by the data collector A14 (e.g., the buckets) and notify the reporter A16 when to start report generation. To generate the buckets, the data collector A14 may scan the file table B13 for a file matching the bucket type. If a match is found, the bucket may be updated with the file information. Upon scanning the last file, the bucket may be saved in the database A19.

The file collector B5 may process files received from agents for the purpose of archiving them. For example, a file to be archived is received in an input directory B30. If the file is improperly named, for example, it is moved to the failed directory B52. Otherwise, the file may be moved to the work directory B40 awaiting archival. Upon completion of the archive, the file may be moved to the archived directory B51.

FIG. 1 illustrates an example storage management system screen 100, according to an example embodiment of the present invention. The storage management system screen 100 may be provided as a graphical user interface on a conventional terminal or personal computer system. Screen 100 may include a menu bar 101 and three tabs 102. The menu bar 101 may include a "File" menu bar item 101a, a "View" menu item 101b, a "Configuration" menu item 101c, and a "Help" menu item 101d. The three tabs 102 include a storage tab 102a, an action sets tab 102b, and a reports tab 102c. The storage tab 102a corresponds to a storage pane displaying storage management information, the action sets tab 102b corresponds to an action pane displaying information facilitating selection of actions to be performed, and the reports tab 102c corresponds to an alert pane displaying a user notification when a predetermined condition occurs regarding one or more of the storage objects. It will be appreciated that other arrangements and interface types may be provided.

Storage management system screen 100 is shown in FIG. 1 with the storage tab 102a selected. The storage tab 102a may be configured to allow a user to view, filter, and sort the storage objects under control of the storage management system. The storage objects may include files, file systems, and servers. If the storage tab 102a is selected, the display 100 may show a finder area 103, a visualizer area 104, and a detailer area 105. The finder area 103 may be used to locate storage objects for display in the visualizer area 104. The visualizer area 104 may display the objects, e.g., by rearranging and hiding columns, and hiding rows. The visualizer area 104 also permits one or more objects to be selected for an action. The detailer area 105 displays storage management information regarding the last object selected in the visualizer area 104.

Figure 2A:
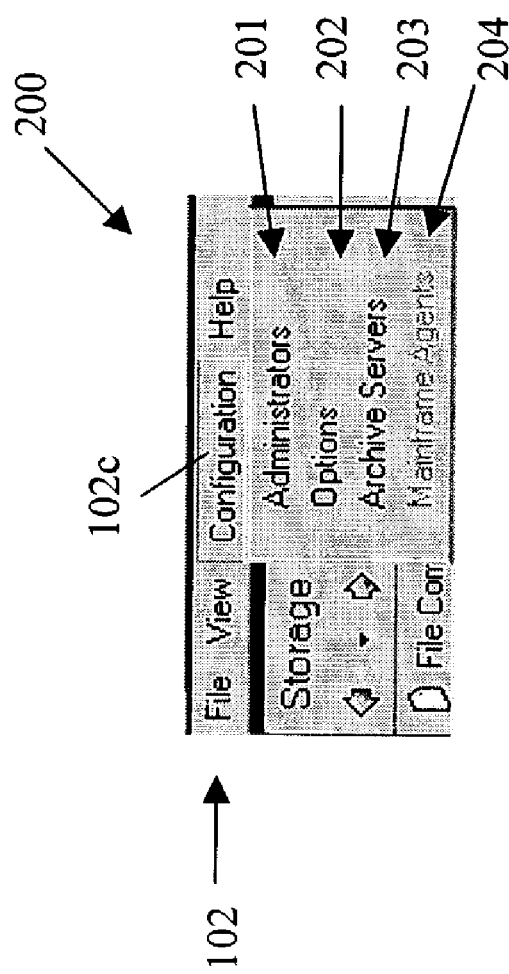
FIG. 2a illustrates a portion of the storage management system screen of FIG. 1 near the menu bar, according to an example embodiment of the present invention.

FIG. 2a illustrates a portion 200 of the storage management system screen 100 of FIG. 1 near the menu bar 101, demonstrating menu items 201–204 of the configuration menu item 101c, according to an example embodiment of the present invention. In particular, the configuration menu items 201–204 include an "Administrators" menu item 201, an "Options" menu item 202, an "Archive Servers" menu item 203, and a "Mainframe Agents" item 204. Menu items, such as for example, the Mainframe Agents item 204, may be "grayed out" indicating that their selection is presently not available.

Figure 2B:
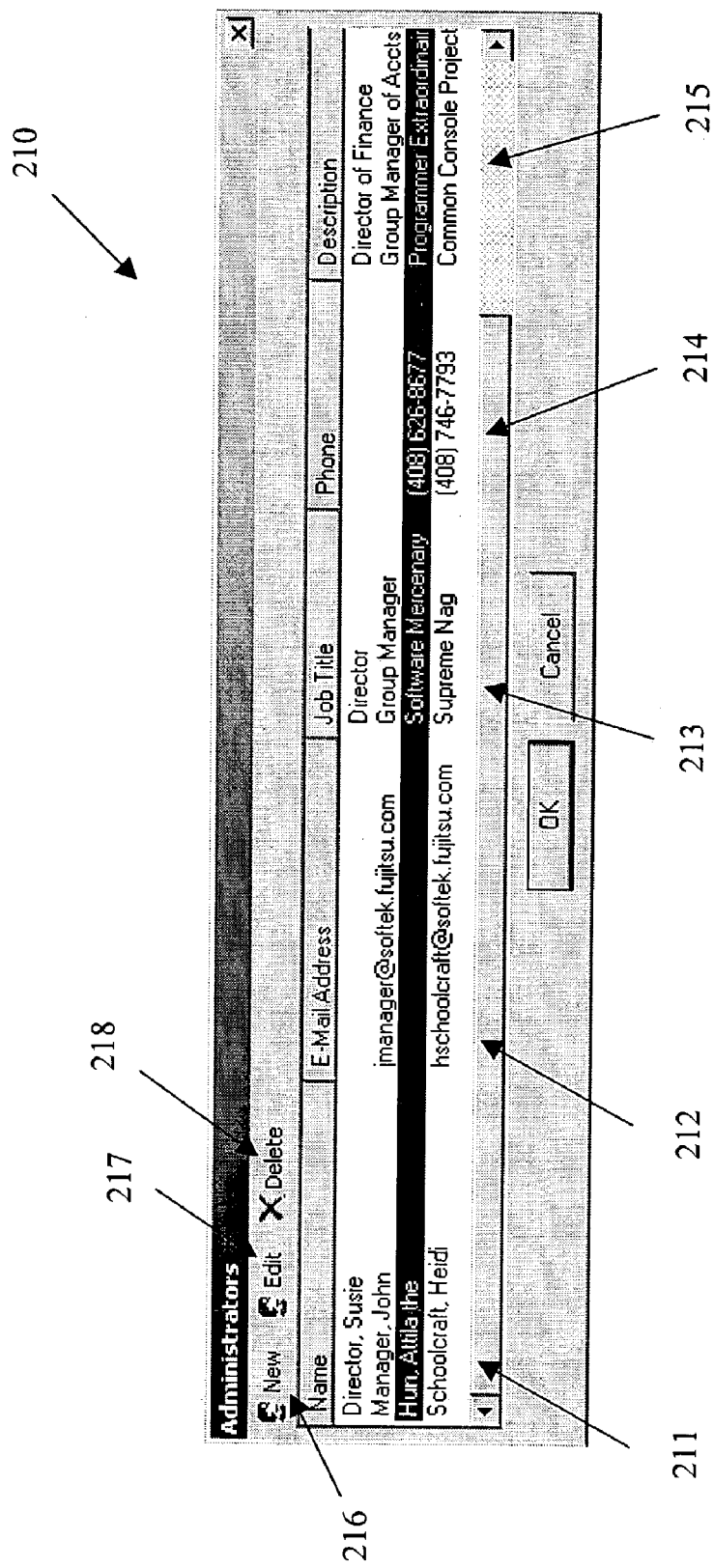
FIG. 2b illustrates an example popup window, according to an example embodiment of the present invention.

FIG. 2b illustrates an example popup window 210, according to an example embodiment of the present invention. The popup window 210 may be displayed upon selecting the administrators menu item 202. Popup window 210 lists the administrators defined in the system along with other storage management information such as a system administrator name 211, an e-mail address 212, a job title 213, a telephone number 214, and a text description 215. The e-mail address 212, may be used, for example, to send alert e-mail notification messages. New administrators may be added by clicking on "New" 216 or the pertinent information regarding defined administrators may be edited by clicking on "Edit" 215 or deleted by clicking on "Delete" 218.

Figure 2D:
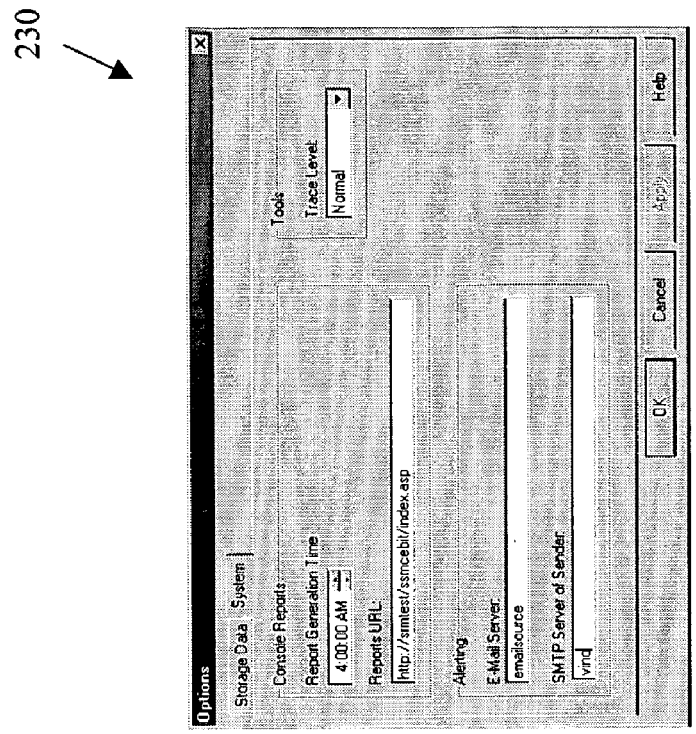
FIG. 2d illustrates another example popup window, according to an example embodiment of the present invention.
Figure 2C:
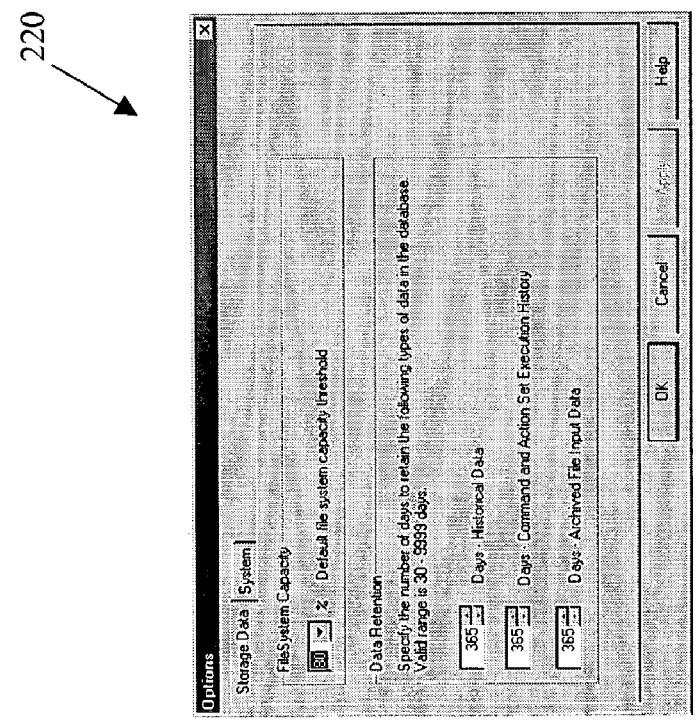
FIG. 2c illustrates an example popup window, according to an example embodiment of the present invention.

FIGS. 2c and 2d show example popup windows 220 and 230, according to an example embodiment of the present invention. The popup windows 220 and 230 may be displayed upon selecting the options item 201. Popup window 220 may list the storage data options. The storage data options may include control of a default system capacity threshold. The default system capacity threshold may trigger an alert, when the capacity of a file system exceeds the threshold. It will be appreciated that rules or policies for individual file systems or groups may override this default. Also included in the storage data options may be data retention criteria, e.g., how long the storage management system retains historical data, commands and action set execution history and archived file input data. Popup window 230 lists the system options. The system options may include reporting options, for example, when and where periodic console reports are generated. The system options may also include information on how or where alerts are generated in response to alert conditions.

Figure 3A:
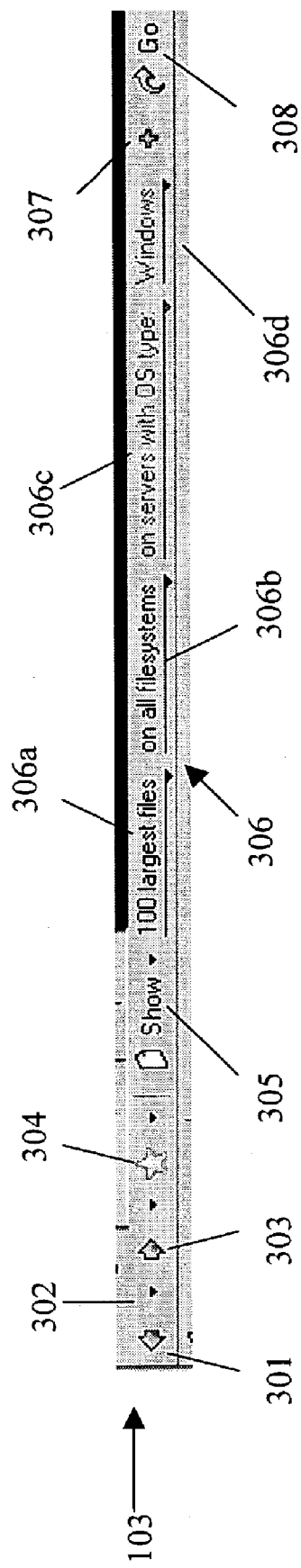
FIG. 3a illustrates an example finder area, according to the example embodiment of the present invention.

FIG. 3a illustrates an example finder area, according to the example embodiment of the present invention. The example finder area 103 may be portion of the display illustrated in FIG. 1. The finder area may be configured to allow a user to generate a query for storage management information on a particular set of storage objects. Finder area 103 may include a back arrow button 301, a small down arrow 302, a forward arrow button 303, a star button 304, a show button 305, a show statement 306, a plus sign button 307, and a go button 308. The back arrow button 301, small down arrow 302, and forward arrow button 303 provide a history function to retrieve previously executed queries. The star button 304 may provide a "favorites" function to preserve previously executed queries upon exit from the application. The show button 305 and show statement 306 specify the filter criteria of a query. The plus sign button provides an adder function to expand the filter criteria of the show statement 306. The go button 307 initiates the query specified by the filter criteria of the show statement 306.

When the query is complete, the queried data may be displayed in the visualizer area 104.

The show statement 306 provides a flexible way to query a selection of storage objects for display in the visualizer area 104. For example, the show statement 306 of FIG. 3*a* includes filter criteria 306*a–d* to restrict the query. Filtering may be based on properties of servers, file systems, files or a combination of all three. According to filter criteria 306*a–d*, show statement 306 specifies that the one hundred largest files 306*a* on all file systems 306*b* on servers with operating system type 306*c* windows 306*d* should be queried for display.

Figure 3B:
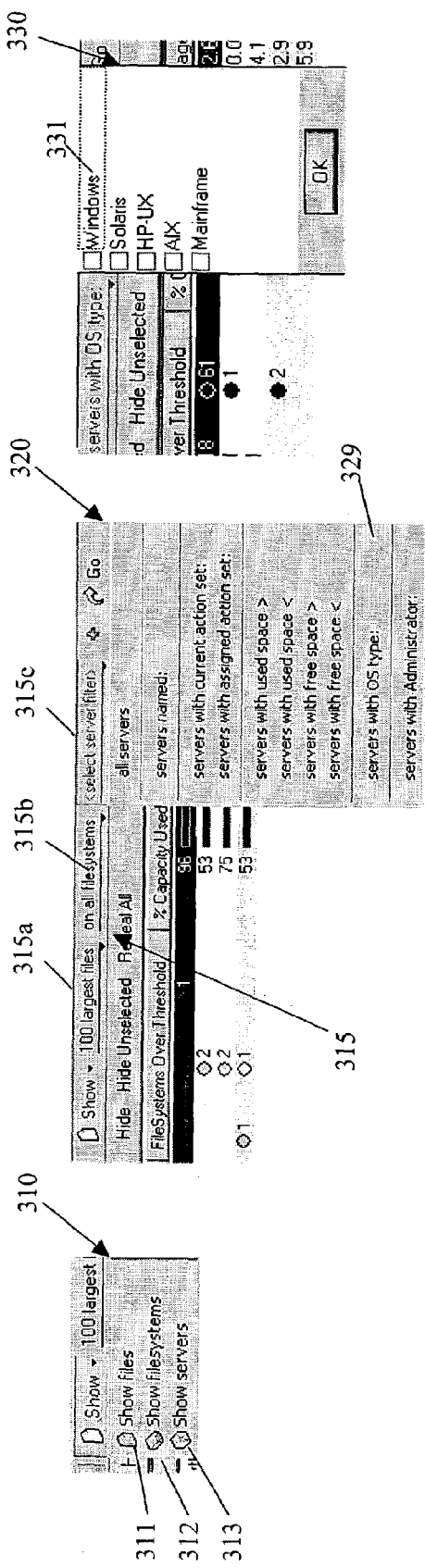
FIG. 3b illustrates example options for constructing a filter criteria according to an example embodiment of the present invention.

FIG. 3*b* illustrates example options for constructing a filter criteria according to an example embodiment of the present invention. The example options 306*a–d* may be provided as the show statement 306 of FIG. 3, according to an example embodiment of the present invention. The show statement 306 is first constructed by selecting an initial filter from a drop down menu selection 310 displayed by clicking the show button 305. Drop down menu selection 310 includes a "Show files" selection 311, a "Show filesystems" selection 312, and a "Show servers" selection 313. Each of the selections 311 through 313 generates an initial default show statement when selected. For example, the "Show files" selection 311 generates an initial default show statement 315 that specifies a filter criteria of the 100 largest files 315*a* on all filesystems 315*b* and an "empty" <select server filter> criteria 315*c* that is "filled" via drop down menus 320 and 330. More specifically, filter criteria 306*c* and 306*d* may be constructed by selecting menu item 329 of drop down menu 320 and menu item 331 of drop down menu 330.

Figure 4:
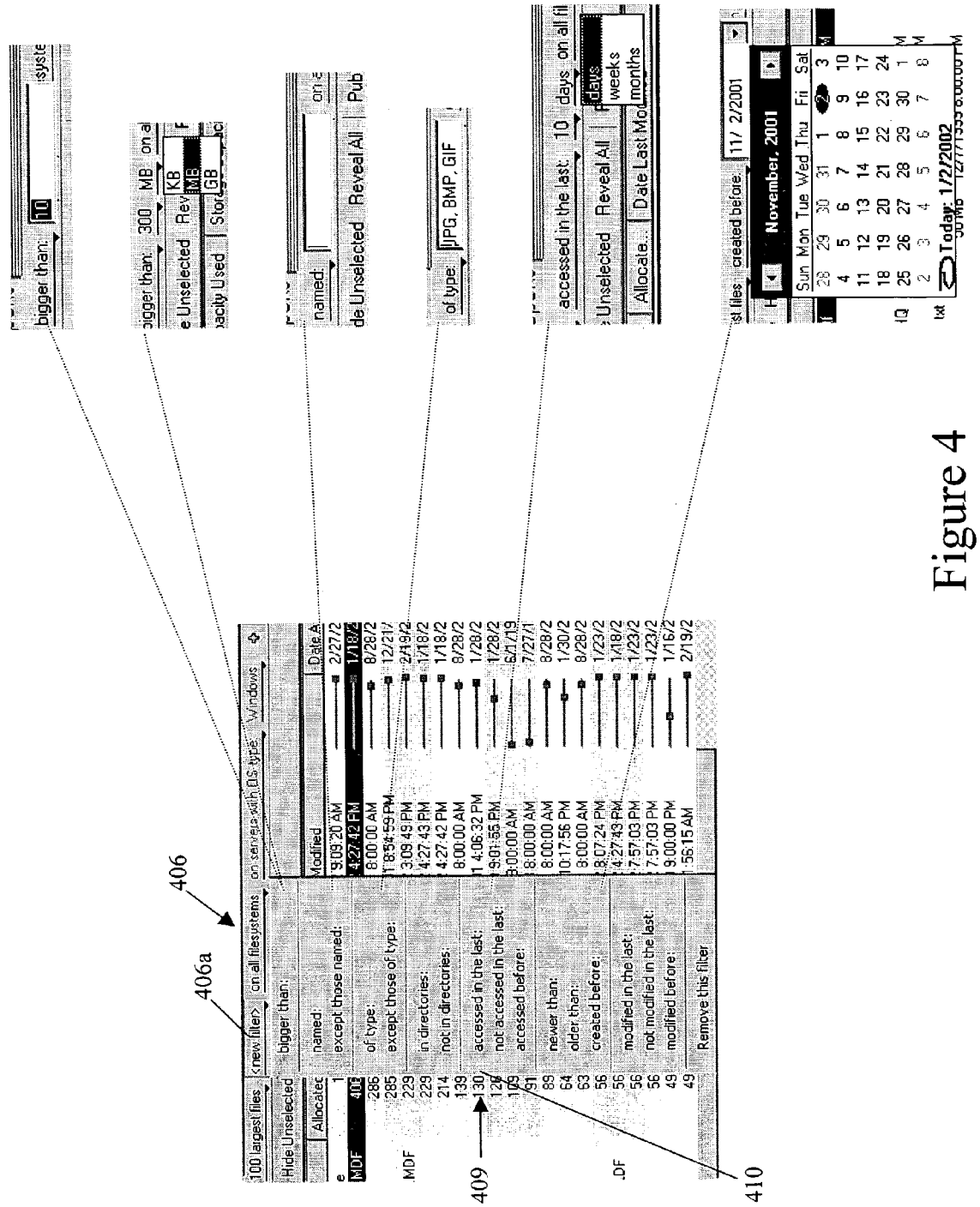
FIG. 4 illustrates example options for adding file filter criteria according to an example embodiment of the present invention.

FIG. 4 illustrates example options for adding file filter criteria according to an example embodiment of the present invention. The example options 306*a–d* may be provided as part of the show statement 306 of FIG. 3*a*. Upon clicking the plus sign button 307, <new filter> 406*a* is added to show statement 406 after existing file filter criteria and prior to file system filter criteria. A drop down menu 409 is displayed directly beneath <new filter> 406*a* listing selectable file filter criteria menu items 410. Examples of popup windows associated with specific file filtering criteria are shown with dotted lines connecting them to their corresponding menu item.

It will be appreciated that the user may add additional filtering criteria to produce a narrower query. A user may also alter the parameters of the filter criteria to change the breadth of a query, e.g., increasing a threshold in a query for all files of greater than a particular size. Criteria for file filtering may include file size, file name, all files except with a certain file name (and width wildcards), files of a certain type or not of a certain type, files in certain directories or not in certain directories, file access time including first and/or most recent access, file age, and file modification date.

It will be appreciated that other file filtering may also be provided.

Figure 5:
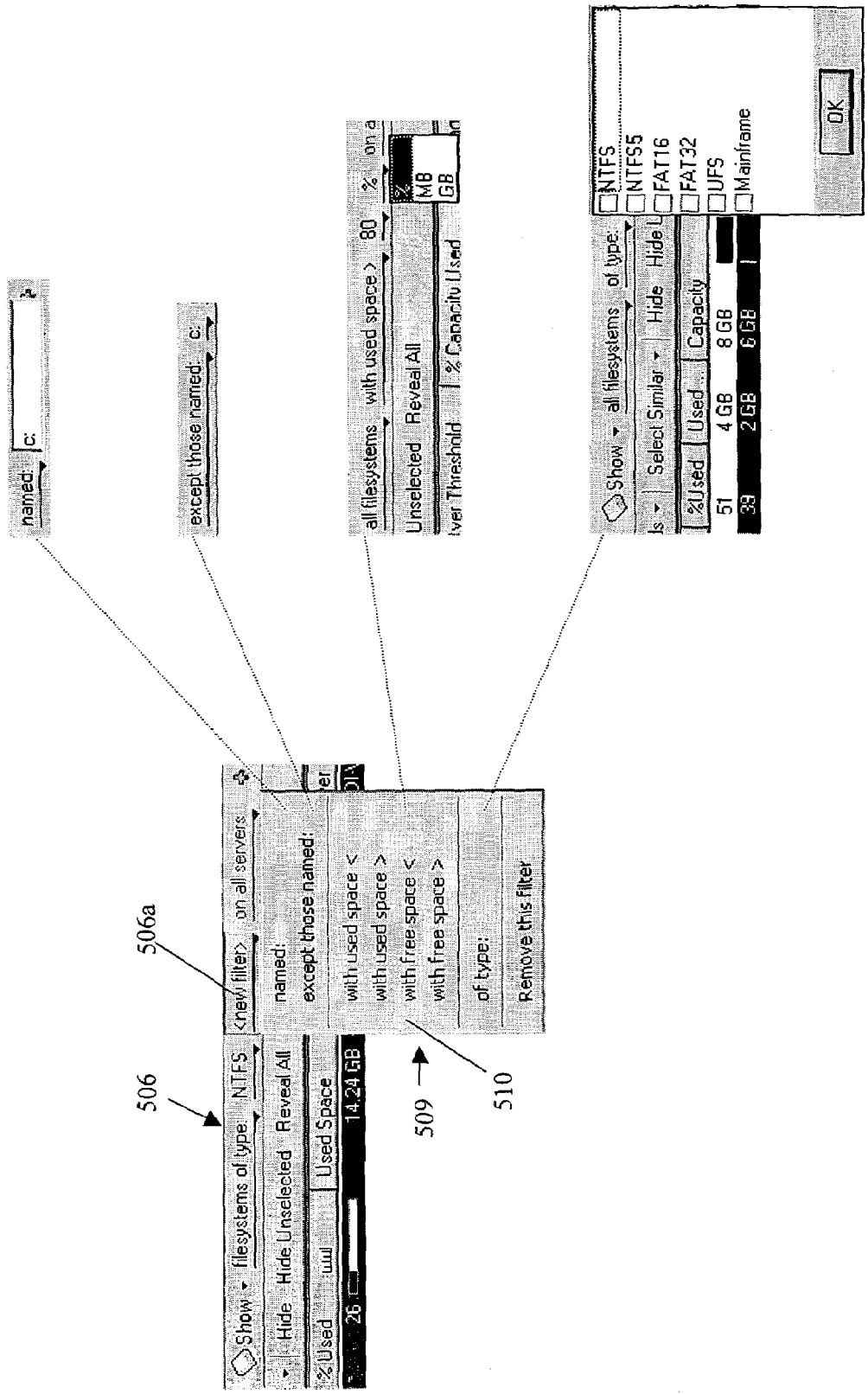
FIG. 5 illustrates example options for adding file system filter criteria according to an example embodiment of the present invention.

FIG. 5 illustrates example options for adding file system filter criteria according to an example embodiment of the present invention. The example options 306*a–d* may be provided as part of a show statement 506. Upon clicking the plus sign button 307, <new filter> 506*a* is added to show statement 506 after existing file system criteria and prior to server criteria. A drop menu 509 is displayed directly beneath <new filter> 506*a* listing selectable file system filter criteria menu items 510. Examples of popup windows associated with specific file system filtering criteria are shown with dotted lines connecting them to their corresponding menu item.

Example file system filter criteria may include file system name (including wildcards), all files systems except a named file system, file systems with more or less than a threshold amount of used or free space, or file systems of a particular type. Pull down menus may be provided for selecting particular types. Thresholding may provided as a percent of capacity, or as an absolute number.

Figure 6:
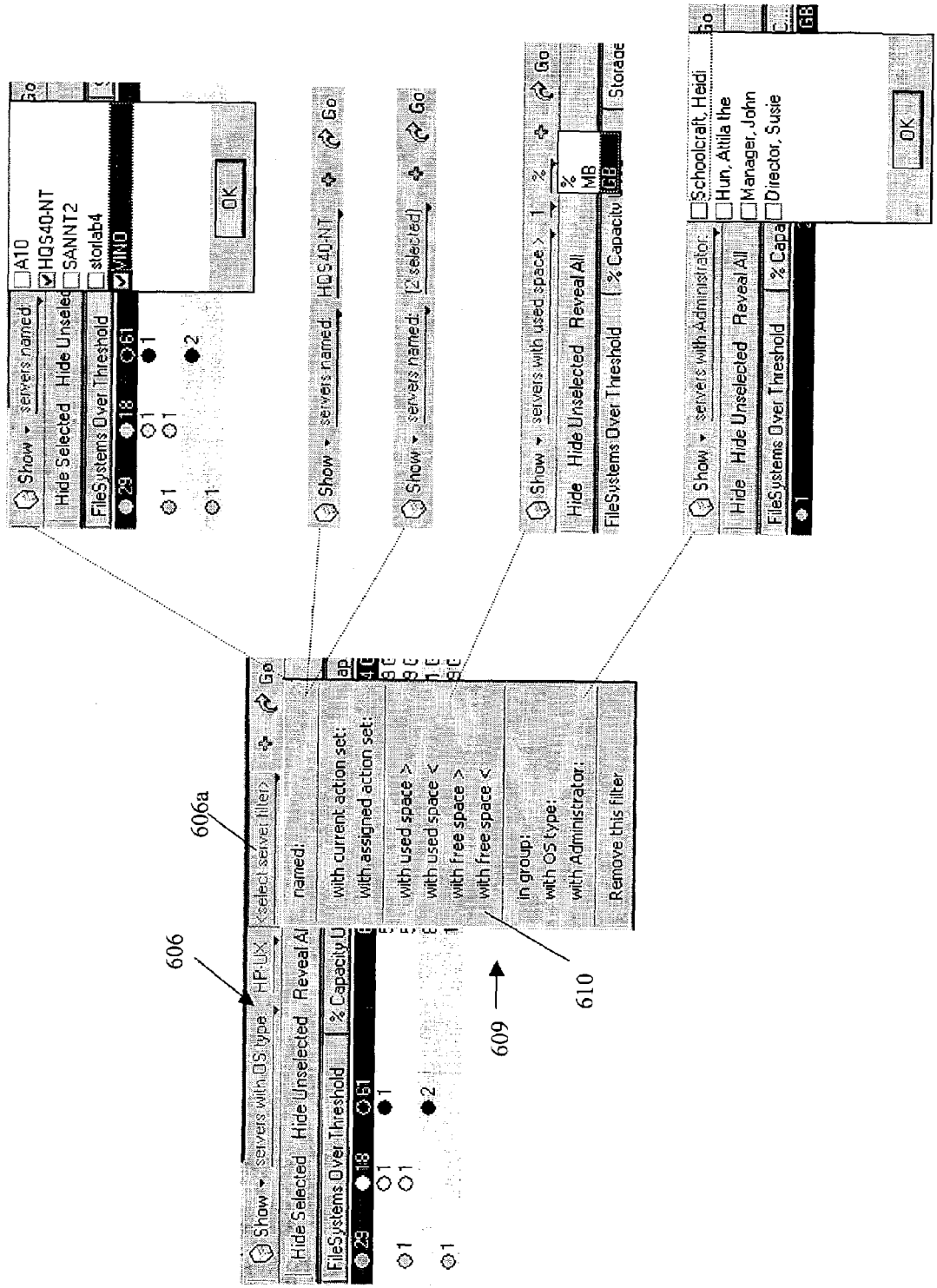
FIG. 6 illustrates example options for adding server filter criteria according to an example embodiment of the present invention.

FIG. 6 illustrates example options for adding server filter criteria according to an example embodiment of the present invention. The example options 306*a–d* may be provided as part of a show statement 606. Upon clicking the plus sign button 307, <new filter> 606*a* is added to show statement after existing filter criteria. A drop down menu 609 is displayed directly beneath <new filter> 606*a* listing selectable server filter criteria menu items 610. Examples of popup windows associated with specific server filtering criteria are shown with dotted lines connecting them to their corresponding menu item.

Example server filter criteria may include server name, servers assigned a particular action set, servers with more or less space, servers in a predefined group, servers with a particular operating system type, and/or servers assigned to a particular administrator. Threshold may be defined as a percent of capacity or as an absolute number. It will be appreciated that other server filtering criteria may be provided.

Figure 7:
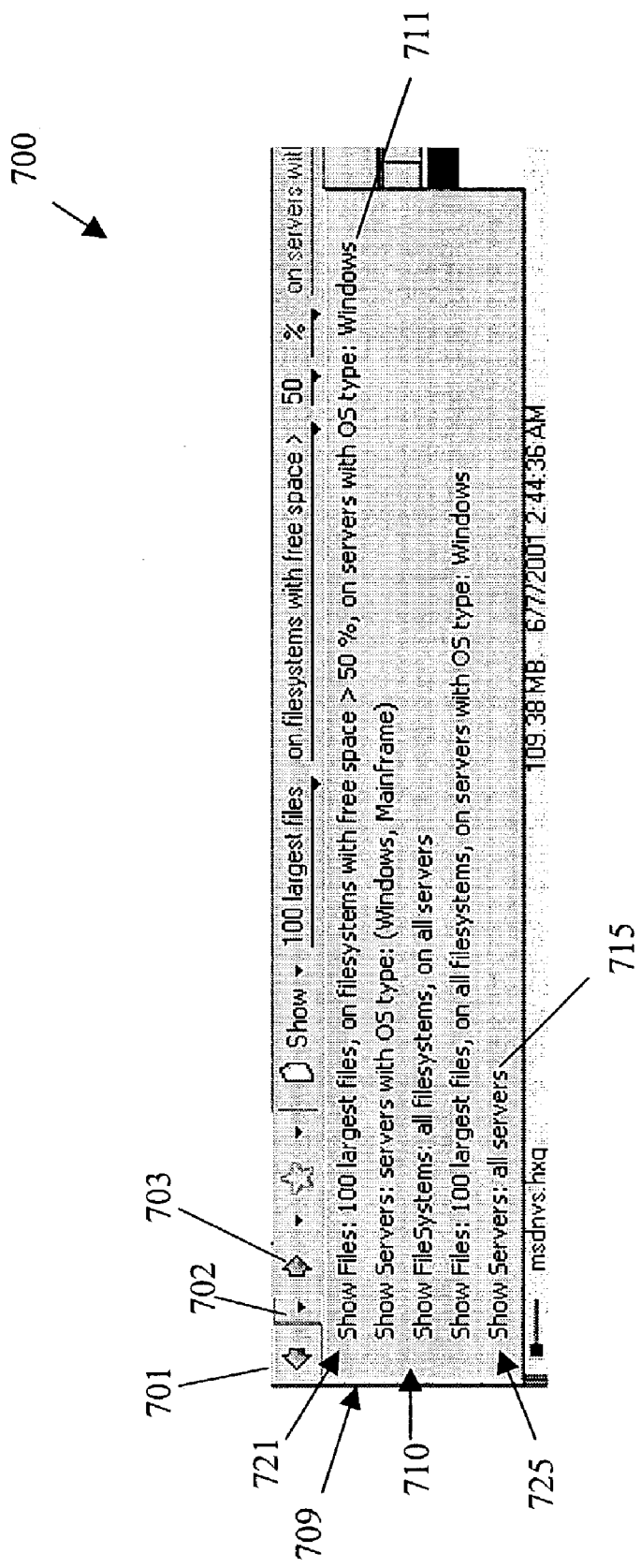
FIG. 7 illustrates an example query history screen according to an example embodiment of the present invention.

FIG. 7 illustrates an example query history screen 700 according to an example embodiment of the present invention. The example query history screen 700 may include the history function of the finder area 103, that may be used to recall and re-execute previously executed show statements. A show statement (query) is added in "History" each time a "Go" is executed, e.g., each time the go button 308 is clicked. The History may contain a maximum number of queries (e.g., 25) and may be cleared upon termination of the program.

Clicking on the back arrow 701 may retrieve the last executed query. The clicking of the back arrow 701 may be repeated to sequentially retrieve the previously executed queries in reverse chronological order. Clicking on the forward arrow 703 may retrieve the previously executed queries forward in time.

Clicking on the small down arrow 702 between the back arrow 701 and the forward arrow 702 displays the pull down menu 709 containing a list 710 of the show statements previously executed. The most recent entry 711 is displayed at the top 721 of list 704. The oldest entry 715 is displayed at the bottom 725 of the list 710. Selecting an show statement entry in list 704 displays it in the finder area 103.

It will be appreciated that query history may also be output in other ways, e.g., as a log file, with a graphical representation, etc.

Figure 8:
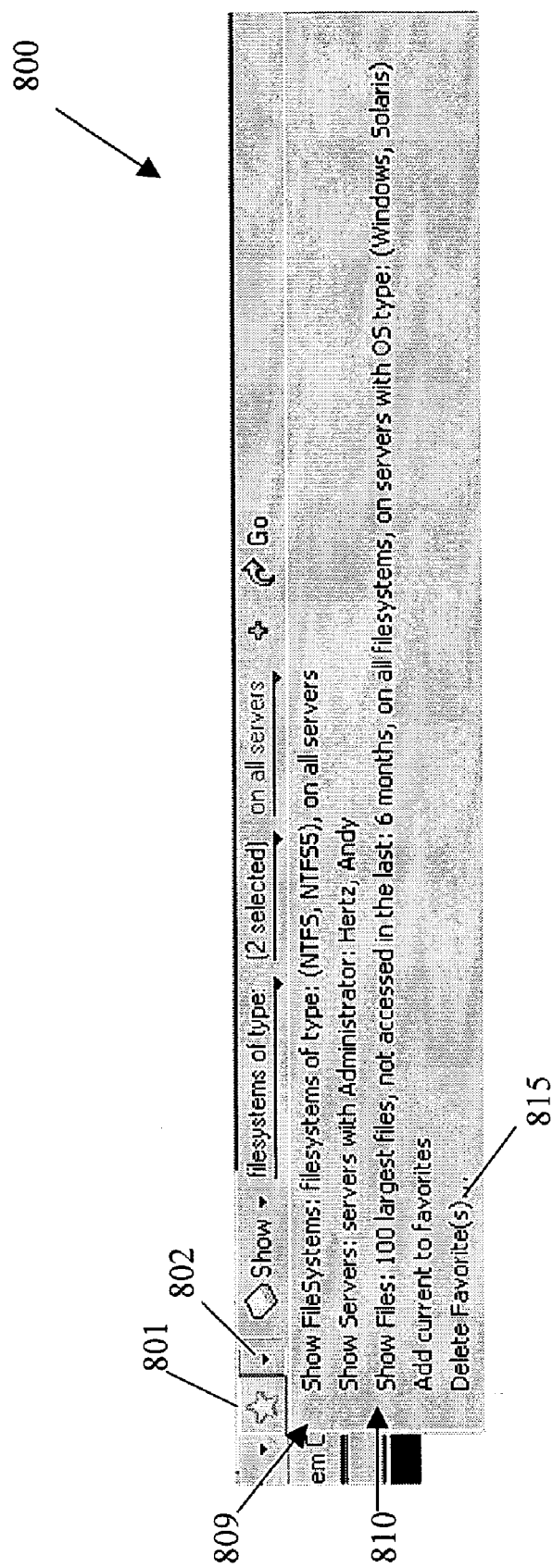
FIG. 8 illustrates an example favorite query screen according to an example embodiment of the present invention.

FIG. 8 illustrates an example favorite query screen 800, according to an example embodiment of the present invention. The example favorite query screen 800 may be accessed demonstrating the favorites function of the finder area 103. The screen 800 may be used to record show statements and to preserve them upon termination of the program. Clicking on the star button 801 may record the last executed query. The number of show statements that may be recorded may have a pre-set maximum, e.g., 50. Clicking on the small down arrow 802 next to the star button 801 displays a pull down menu 809 containing a list 810 of favorite show statements. Selecting a show statement entry in list 810 displays it in the finder area 103. Selecting the "Delete Favorite(s) . . . " item 815 of list 810 causes a popup window to be displayed, prompting the selecting of entries to be removed.

Figure 9:
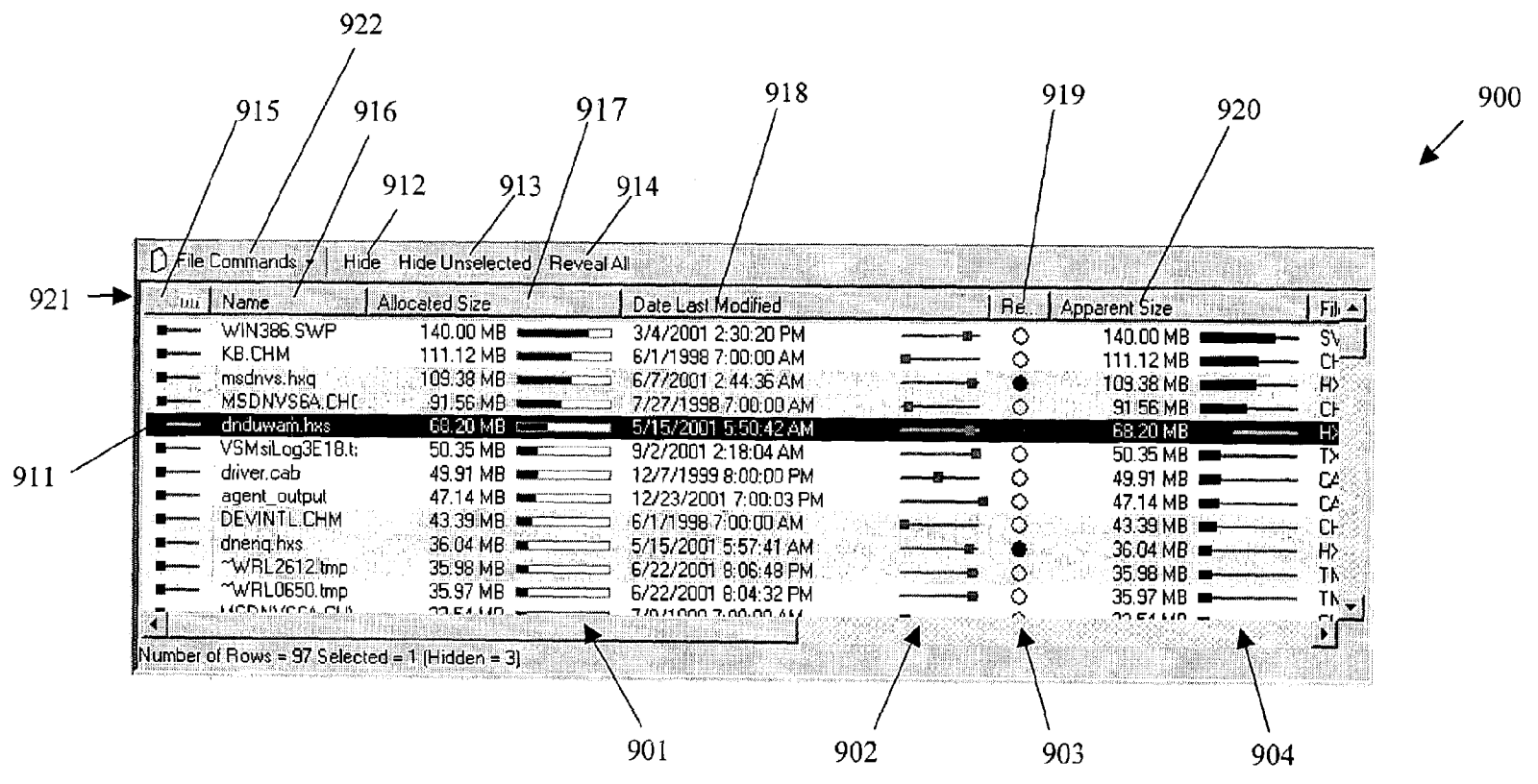

FIG. 9 illustrates an example table view display 900 of visualizer area 104 of the storage management system screen 100 of FIG. 1. The example table view display 900 provides the ability to display storage management data, e.g., numeric data with an associated graphical representation. Table view display 900 provides four styles of graphical display including a bar-in-frame display style 901, a scatter point display style 902, a boolean display style 903, and a bar display style 904. The bar-in-frame display style 901, the scatter point display style 902, and the bar display style 904 are normalized to range from the highest and lowest values in their respective column. The boolean display style 905 represents a True/False or Yes/No state, wherein by default, a circle filled-in or colored represents a value of True or Yes and a circle non-filled or non-colored represents a value of False or No.

Selecting a row 911 of table view display 900 displays detailed storage management data to the corresponding storage object. Rows may be "hidden" from the table view display 900 via the hide button 912 or the hide unselected button 913. Hidden rows are "unhidden" and therefore re-displayed in the table view display 900 via the reveal all button 914.

The table view display 900 may include columns of storage object attributes. As shown in FIG. 9, the columns may include a last-scanned column 915, a name column 916, an allocated size column 917, a date last modified column 918, a read only column 919, and an apparent size column 920. The last-scanned column 915 provides a graphical indication of when the storage management information was last collected. The name column 916 provides a text description of the filename/file system name/server name of the storage object. The allocated size column 917 provides a graphical indicator and/or text description of the of the actual amount of storage space of the storage object. The date last modified column 918 provides a graphical indicator and/or text description of when the storage object was last modified. The read only column 919 provides a graphical indicator and/or text description of whether the storage object may be modified. The apparent size column 920 provides a graphical indicator and/or text description of size of the storage object as reported by the resident operating system. Other storage object attributes that may be displayed as columns in the table view display 900 include a date last accessed, a file type, a date created, a server name, a file system name, a path name, and a file system type.

The columns of table view display 900 may be resized, removed, reordered, or sorted by manipulating the column headers 921. The column headers 921 may be dragged to resize or reorder the columns or they may be clicked to sort the information displayed in a column. When a column is resized to less than 20 pixels, for example, the column disappears. The display of a column or of its characteristics may also be adjusted via a configurator popup menu that may be displayed, for example, by "right-clicking" in the column headers 921. The table view display 900 of FIG. 9 may also include a command button 922 to initiate an action upon the storage object(s) selected in the visualizer area 194. The actions include delete, archive, archive and delete, update, and export view. When an action is selected, a modal floating window may be displayed listing the selected storage objects and the action to be performed on them. The storage objects shown in the floating modal window are displayed in the same order as they are displayed in the visualizer area 104.

It will be appreciated that different types of storage management data may be displayed (and that some of the types shown may be omitted). It will also be appreciated that other ways of displaying storage management data may be provided, e.g., graphical charts or plots, text reports, etc.

Figures 10A, 10B:
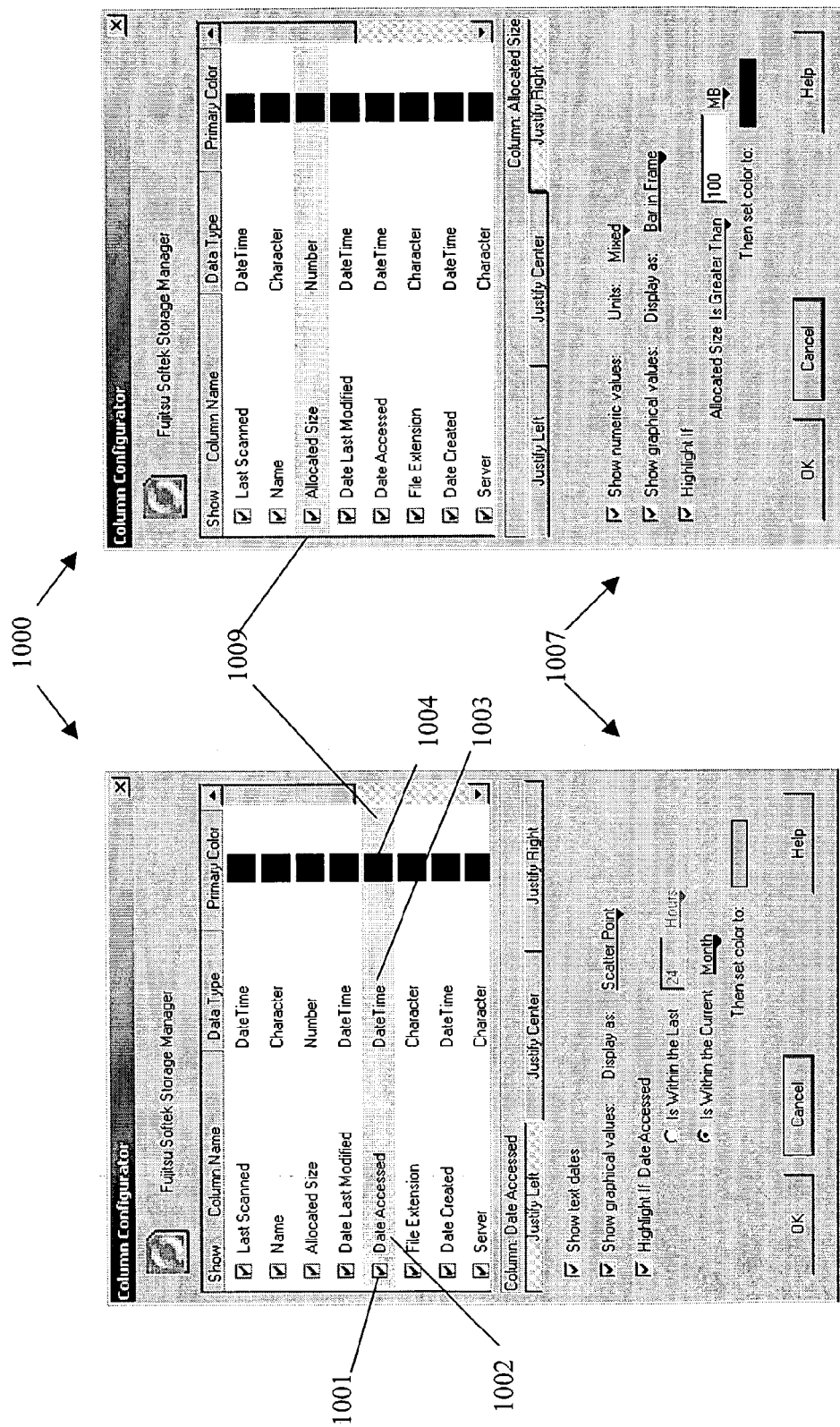
FIG. 10a illustrates example settings of a column configurator window, according to an example embodiment of the present invention.
FIG. 10b illustrates other example settings of a column configurator window, according to an example embodiment of the present invention.

FIGS. 10a and 10b illustrate example settings of a column configurator window 1000, according to an example embodiment of the present invention. The column configurator may be used to customize the output of the visualizer. An entry 1009 in the column configurator window 1000 includes a check box 1001, a column name 1002, a data type 1003, and a primary color 1004. The check box 1001 determines whether or not the column is displayed in the table view display 900 of visualizer area 104 (e.g., if "checked" then column is displayed; if "unchecked" then column is not displayed). The data type 1003 determines the specifics of the lower portion 1007 of the column configurator window 1000.

Figure 11A:
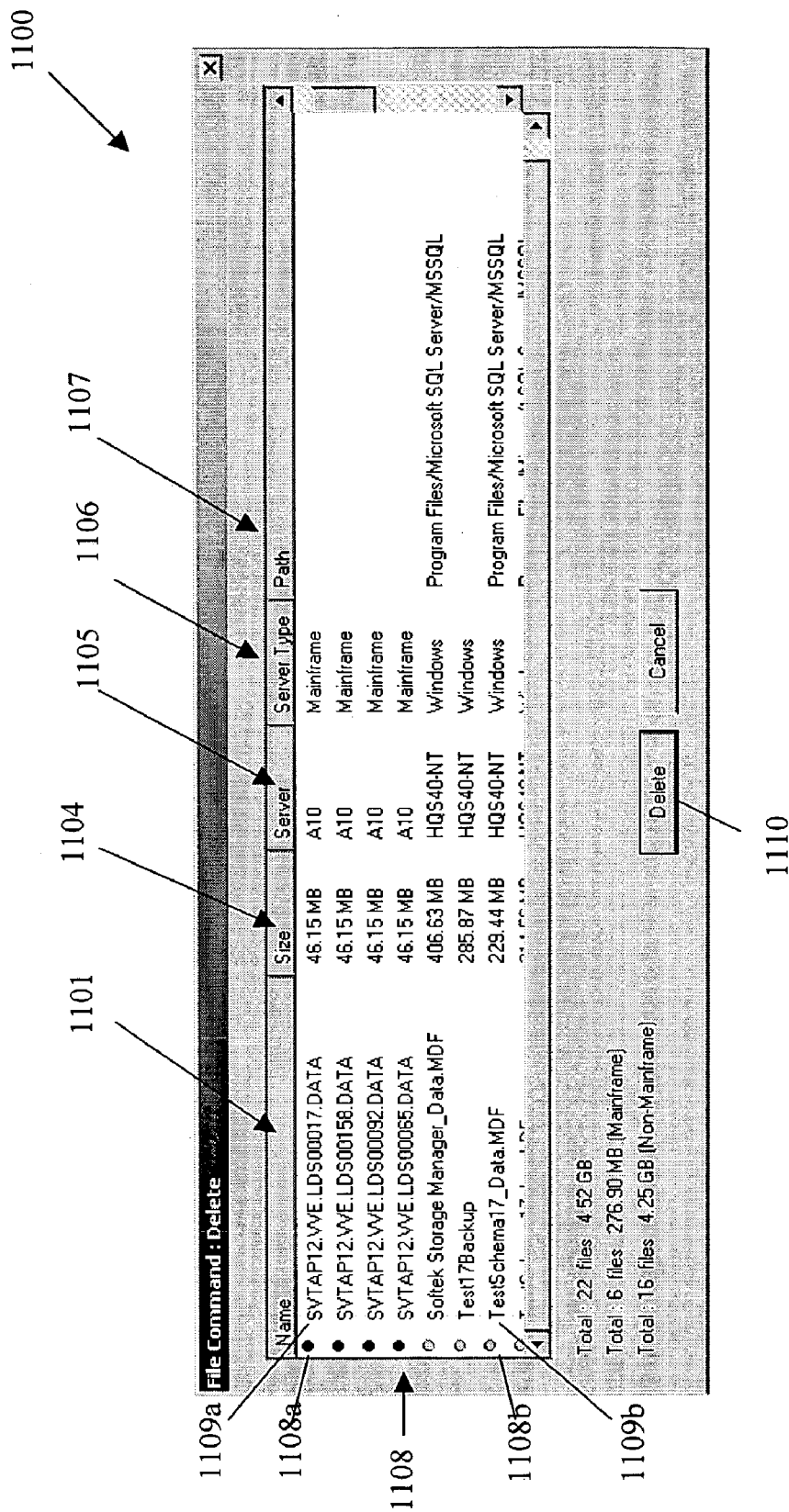
FIG. 11a illustrates an example modal floating window according to an example embodiment of the present invention.

FIG. 11a illustrates an example modal floating window 1100 according to an example embodiment of the present invention. The example modal floating window 1100, may be displayed upon selecting the delete command. Similar windows may be provided for other commands. The modal floating window 1100 may include a list of files 1101 selected for the delete action along with their size 1104, the associated server 1105, the server type 1106, and a pathname 1107. The list of files 1101 may be arranged in the same order as they appeared in the visualizer area 104. The modal floating window 1100 may also include circle indicators 1108 that may be displayed with the list of files 1101. A "red" circle indicator 1108a displayed next to a file 1109a indicates that the delete action will not be performed for the file 1109a. A "green" circle 1108b displayed next to a file 1109b indicates that the delete action will be performed on the file 1108b. Mainframe files, for example, may not be deleted or archived in some embodiments and, in such cases, will display a "red" circle.

Figure 11B:
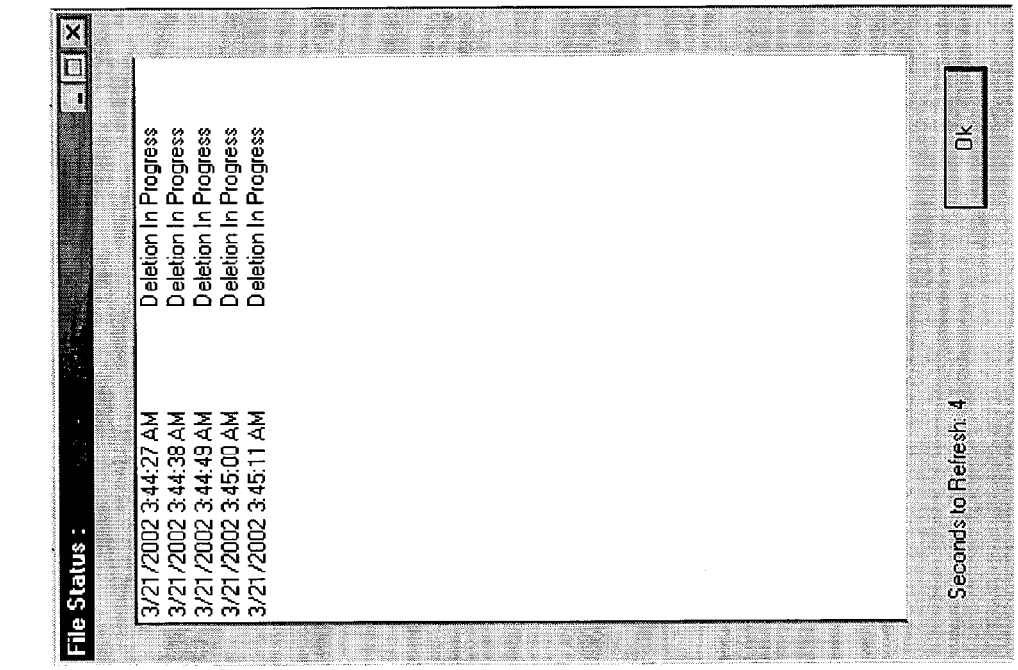
FIG. 11b illustrates an example modal floating window according to an example embodiment of the present invention.

After clicking the delete button 1110 appearing in the lower portion of the modal floating window 1100, another modal floating window 1120 as shown in FIG. 11b will appear (e.g., a status screen) that may be refreshed periodically until the status indicates the delete action is complete.

Figure 12A:
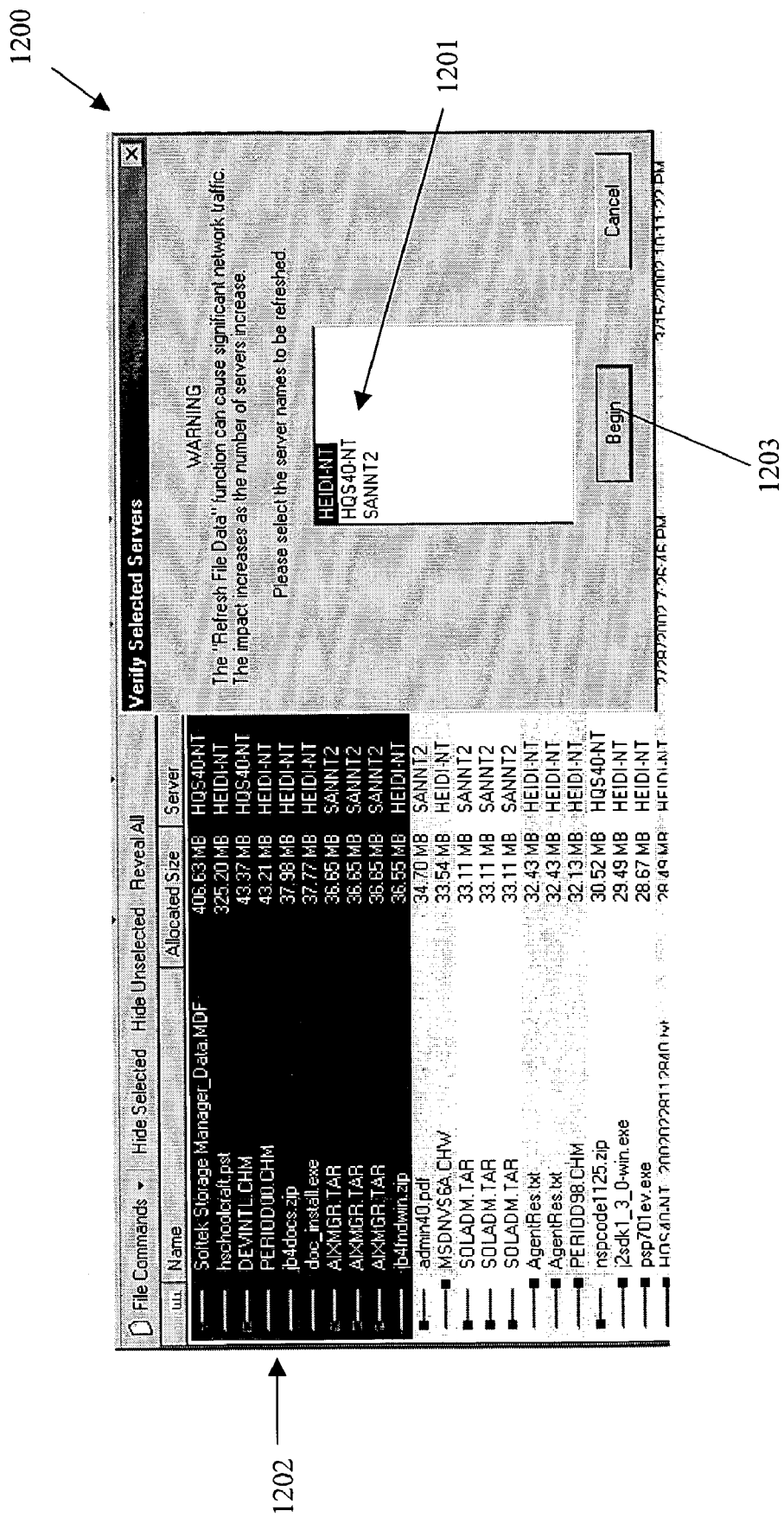
FIG. 12a shows an example modal floating window according to an example embodiment of the present invention.
Figure 12B:
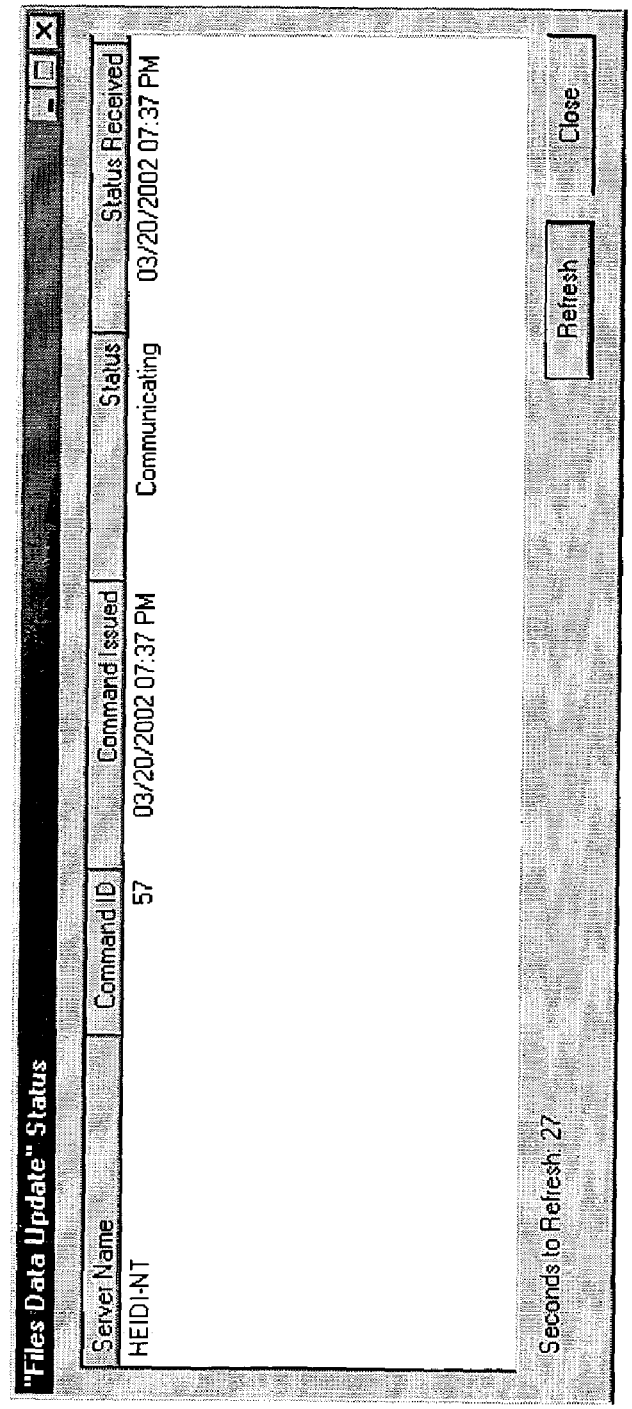

FIG. 12a shows an example modal floating window 1200 according to an example embodiment of the present invention. The example modal floating window 1200 may be displayed upon selecting the update command. The modal floating window 1200 may include a list 1201 of servers associated with the files selected 1202. Once the servers are selected from the list 1201 and the begin button 1203 is clicked, the modal floating window 1200 is replaced by another modal floating window 1220 (e.g., a status screen) as shown in FIG. 12b, that refreshes periodically until the status indicates the update action is complete.

Figure 13A:
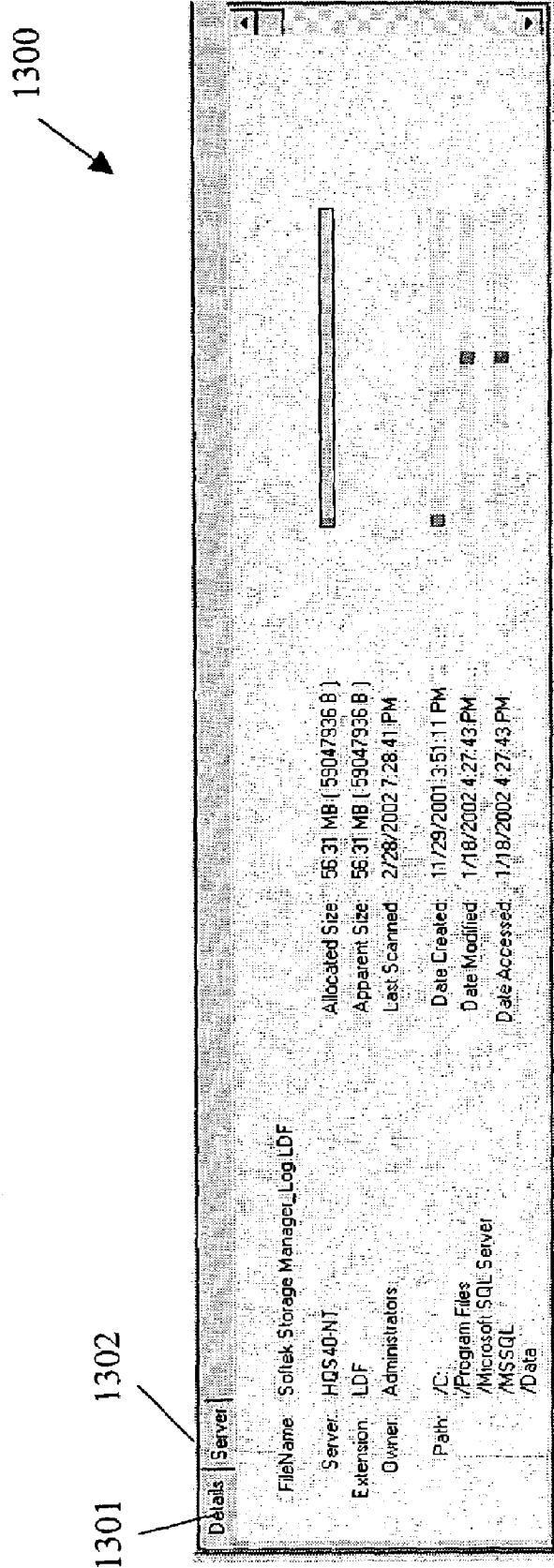
FIG. 13a illustrates an example details pane according to an example embodiment of the present invention.

FIG. 13a illustrates an example details pane 1300 according to an example embodiment of the present invention. The details pane 1300 may be displayed upon selection of the details tab 1301 of the detailer area 105 of FIG. 1. Clicking on the details tab 1301 displays all known information about the last file selected in the visualizer area 104. Storage management information that may be included in details 1300 may include a file name, a server where the file resides, the type, the files allocated size, the file's apparent size, the date and time when the file was last scanned, the date and time when the file was created, the date and time file was last modified, and the date and time the file was last accessed. Graphical indications of numeric quantities may also be provided. It will be appreciated that other storage management information for the file may be provided, e.g., a freshness indication for the data that some information shown may be omitted, and that other forms of output for the file storage management information may be provided, e.g., reports, e-mails, or other display formats.

Figure 13B:
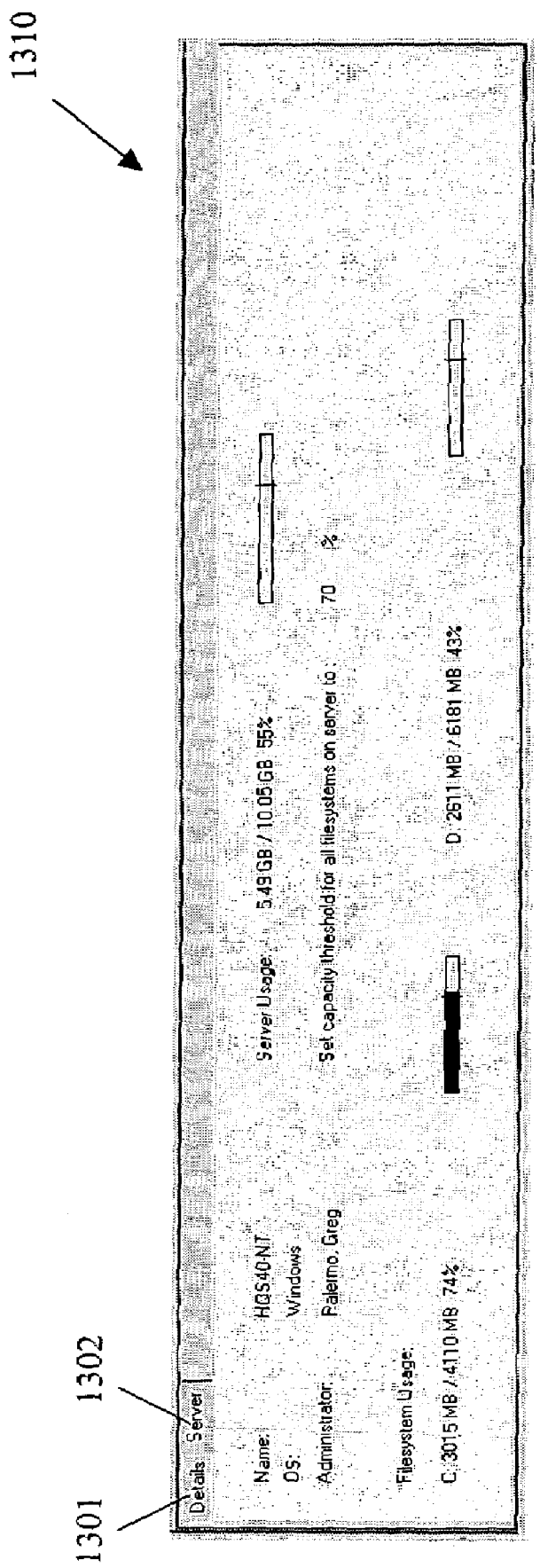
FIG. 13b illustrates an example server pane according to an example embodiment of the present invention.

FIG. 13b illustrates an example server pane 1310 according to an example embodiment of the present invention. The example server pane 1310 may be server may be displayed upon selection of the server tab 1302 of the detailer area 105 of FIG. 1. Clicking on the server tab 1302 displays relevant information about the server and its file systems.

Server pane 1310 may include a server name, the server operating system, the server administrator, file system usage for file systems on the server, server usage, and the capacity threshold for file systems on the server. Graphical indications of numeric quantities may be provided, e.g., a bar meter for capacity. It will be appreciated that other server-related storage management information may be included in the server pane 1310, and that some of the information shown in the example may be omitted. It will also be appreciated that other forms of output for the server storage management system may be provided, e.g., reports, e-mails, or other display formats.

Figure 14:
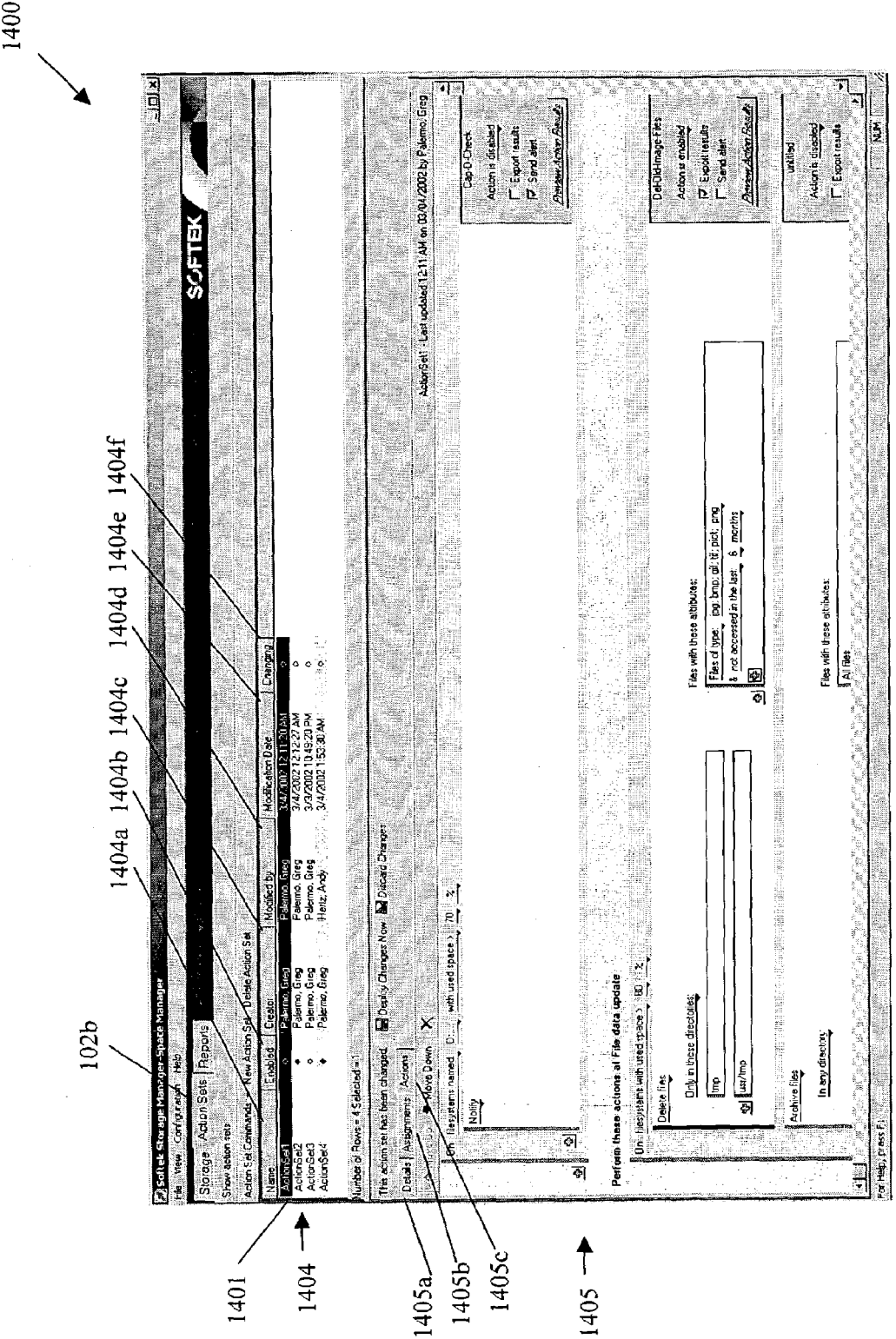
FIG. 14 illustrates an example action sets screen according to an example embodiment of the present invention.

FIG. 14 illustrates an example action sets screen 1400 according to an example embodiment of the present invention. The action sets screen 1400 may be displayed upon selecting the action sets button 102b of FIG. 1. The action sets screen 1400 may allow the system administrator to create new action sets or policies, to test the action set or policies, and to assign the action set or policies to a server or group of servers. The action sets screen 1400 also may allow the system administrator to modify an existing action set.

The action sets screen 1400 may include a visualizer area 1404 and a detailer area 1405. Selecting an action set 1401 in the visualizer area 1404 displays that action set's rules in the detailer area 1405. The detailer area 1405 allows the system administrator to review and/or modify the rules associated with the selected action set 1401.

The visualizer area 1404 includes columns of action set attributes. As shown in FIG. 14, the action set attributes may include an action set name 1404a, an action set status 1404b (either enabled or disabled), a creator of the action set 1404c, a person who last modified the action set 1404d, a date of the last modification 1404e, and a "changing" indicator 1404f to indicate if changes have been made to the action set. It will be appreciated that other kinds of action attributes may be provided, e.g., count of servers where the action set is active, a number of actions in the action set, and count of the servers where the action is assigned, etc.

An action set may be configured to execute immediately after data collection in the context of the servers for which it is assigned. Multiple action sets may be assigned to a server but in example embodiment only one may be active at any time. Multiple active action sets may require more sophisticated concurrency control. An action set must be both active and enabled to execute and perform actions. An individual action rule of the action set may be individually enabled or disabled.

The detailer area 1405 of the action sets screen 1400 includes 3 tabs: a details tab 1405a, an assignments tab 1405b, and an actions tab 1405c, described in more detail below. The details tab 1405a may be selected to name the action set, define the data collection schedule, and define other meta data. The actions tab 1405b may be selected to define rules and actions. The assignments tab 1405c may be selected to assign an action set to a server or group of servers.

It will be appreciated that other information may be included in the action set screen. Other input interfaces or arrangement of the input interface already described may also be provided for specifying and controlling action sets, e.g., a machine accessible API may be provided to interface with other administration tool, and a command-type interface may be provided for low-speed remote access.

Figure 15A:
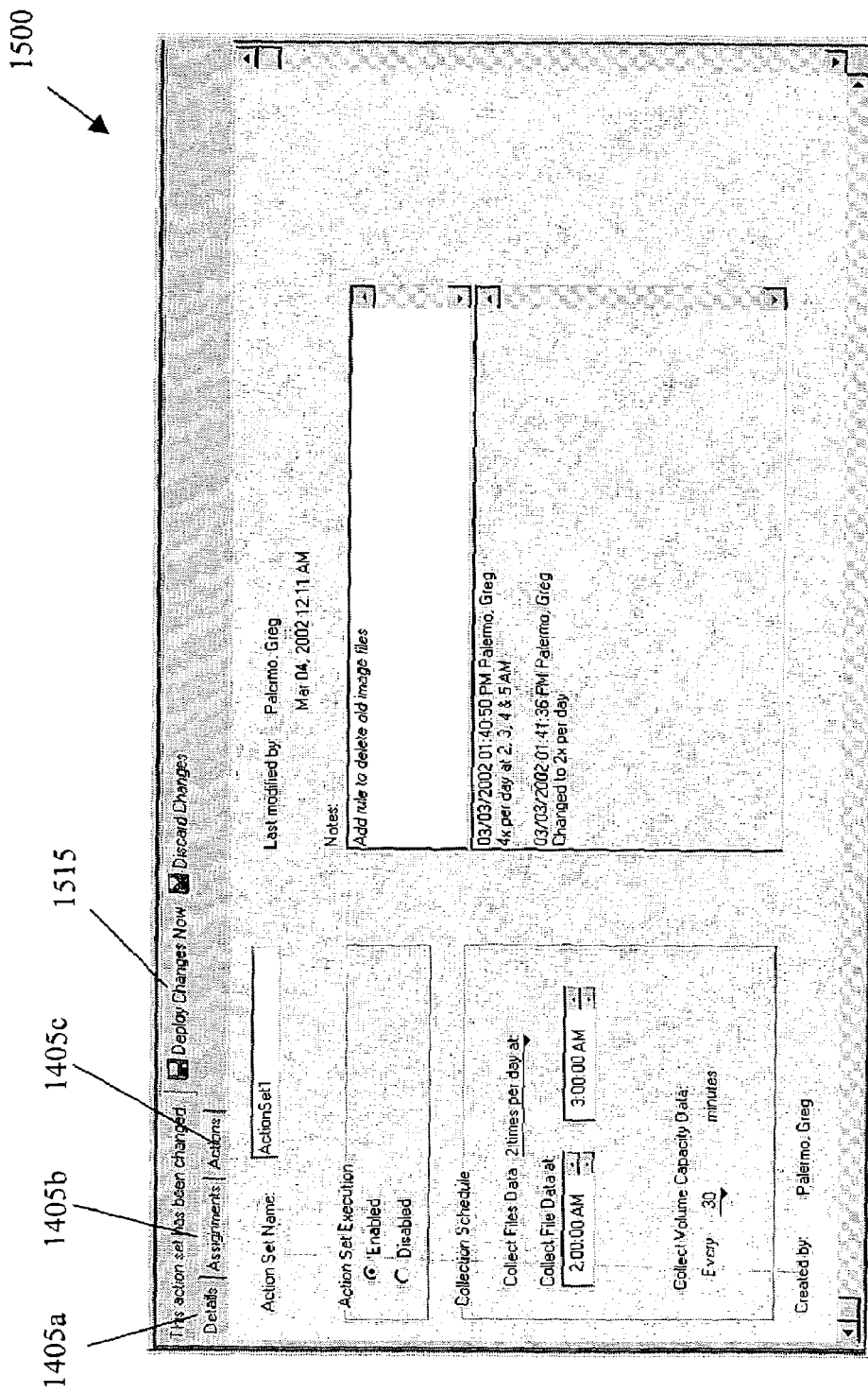
FIG. 15a illustrates an example details screen according to an example embodiment of the present invention.

FIG. 15a illustrates an example details screen 1500 according to an example embodiment of the present invention. The details area screen 1500 may be displayed upon selection of the details tab 1405a. The details screen 1500 may allow specification of an action set name for a new action set or for the retrieval of an existing saved action set. The details screen 1500 may include a input button or other switch for enabling/disabling the action set. The details screen 1500 may include a collection schedule specification subscreen, allowing user input to specify a periodic collection of storage management data.

The details screen 1500 may also include administrative data for the action set, e.g., the creator, last modified, and a notes log.

As shown in FIG. 15a, the action set is enabled; the data collection schedule is 2 times per day at 2:00:00 am and 3:00:00 am; the action set was created by Greg Palermo; the action set was last modified by Greg Palermo on Mar. 4, 2002 at 12:11 am; with notes that specify "Add rule to delete old image files". The date and time of the modification, as well as the name of modifier, may be automatically added to the notes when changes are deployed.

Figure 15B:
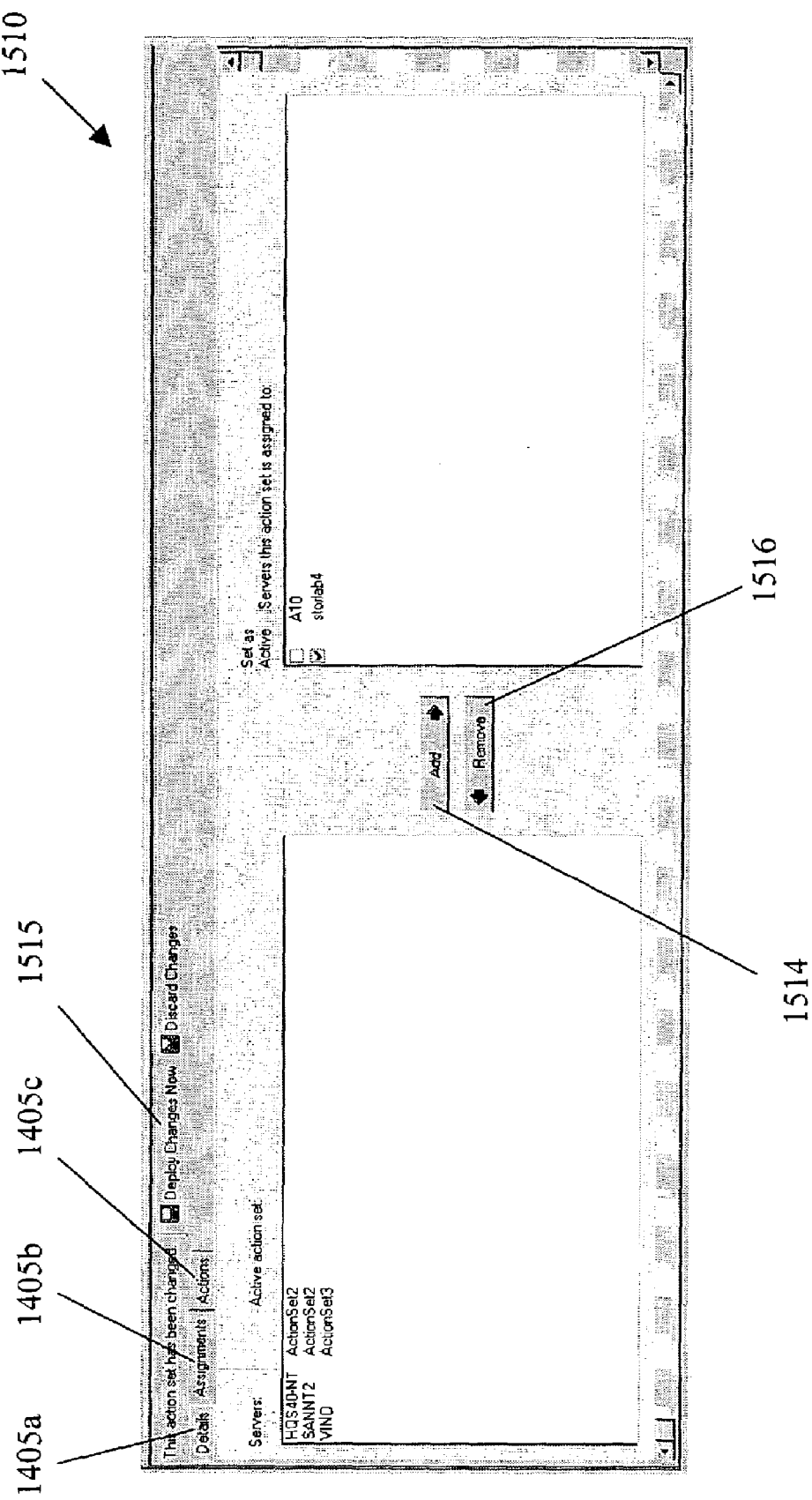
FIG. 15b illustrates an example assignment screen according to an example embodiment of the present invention.

FIG. 15b illustrates an example assignment screen 1510 according to an example embodiment of the present invention. The example assignment screen 1510 may be displayed upon selection of the assignments tab 1405b. A list of servers with corresponding active action sets is displayed. To assign a server to the action set currently being modified, one or more of the list of servers is selected and the add button 1514 is clicked. The assignment takes effect upon clicking the deploy changes now button 1515. Servers may also be removed from an action set with the remove button 1516.

Figure 15C:
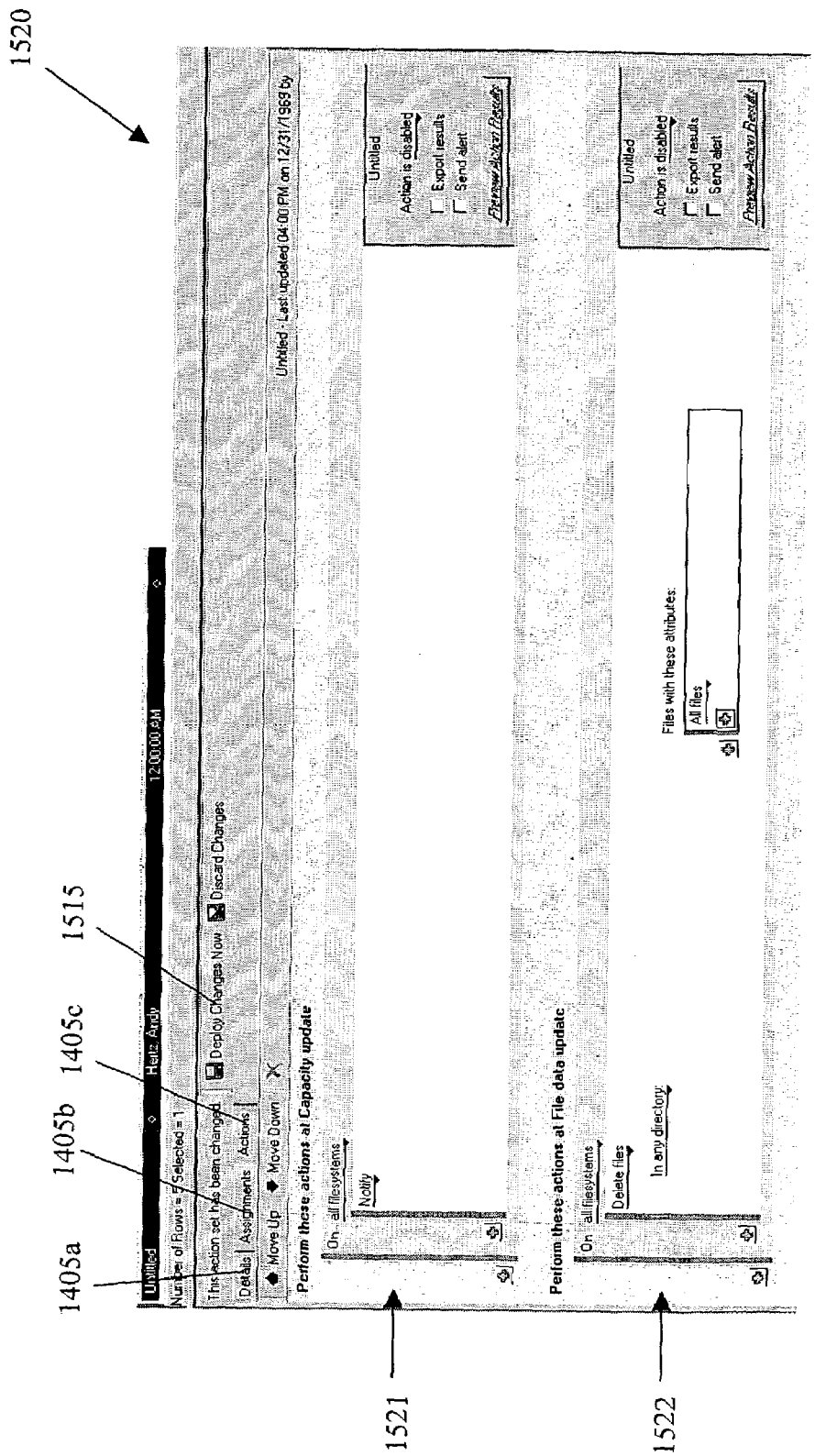
FIG. 15c illustrates an example actions screen according to an example embodiment of the present invention.

FIG. 15c illustrates an example actions screen 1520 according to an example embodiment of the present invention. The actions screen 1520 may be displayed upon selection of the actions tab 1405c. The actions screen 1520 may include a first policy segment area 1521 and a second policy segment area 1522. The first policy segment area 1521 corresponds to actions to be performed when a capacity update occurs and the second policy segment area 1522 corresponds to actions to be performed when a file data update occurs. During a capacity update, information regarding free space and used space is updated. During a file data update, information regarding files is updated. For example, depending on how the system is administered, file system capacity may be updated frequently, at intervals ranging from 15 minutes to 2 hours, while file data updates may be updated less frequently, up to 4 times daily.

The first and second policy segment areas 1521, 1522 may include one or more action rule groups. The action rule group includes a set of action rules, a target context (e.g. a file system or server) to apply the action rules, and an optional threshold condition(s) to trigger the action (e.g. upon exceeding or falling below a predefined storage capacity). An action rule includes a set of actions to be performed, an optional set of filters to include or exclude specific storage objects (e.g. objects such as files located on specific directories of a targeted file system) and/or objects with specific attributes (e.g. objects such as files of a certain size, type, creation, modification, access date, etc.).

Figure 15D:
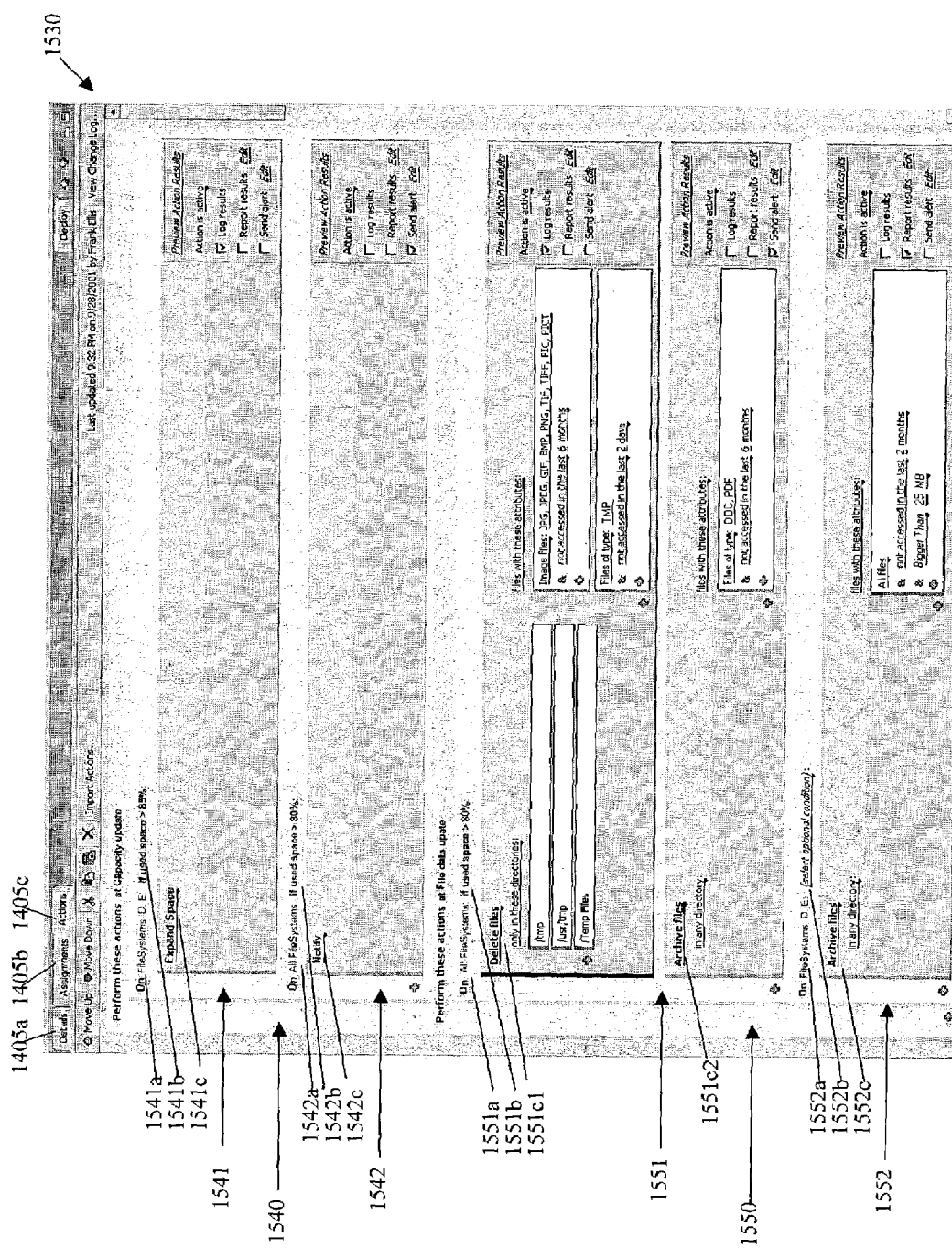
FIG. 15d illustrates another example actions screen according to an example embodiment of the present invention.

FIG. 15d illustrates another example actions screen 1530 according to an example embodiment of the present invention. The actions screen 1530 may displayed upon selection of the action tab 1405c. The actions screen 1530 includes a capacity update policy segment area 1540 and a file data update policy segment area 1550. The capacity update policy segment area 1540 corresponds actions to be performed when a capacity update occurs and the file data update policy segment area 1550 corresponds to actions to be performed when a file update occurs. The specific times associated with a capacity update or file data update may be found in the detail area of the actions set screen which may be accessed via the details tab 1405a and for which an example is provided in FIG. 15a.

The capacity update policy segment area 1540 of the actions screen 1530 includes two rule groups, e.g., a first capacity update rule group 1541 and a second capacity update rule group 1542. The first capacity update rule group 1541 includes a first capacity update target context 1541a, a first capacity update threshold condition 1541b and an associated first capacity update action rule 1541c. The first capacity update target context 1541a targets the file systems D and E, the first capacity update threshold condition 1541b triggers if the used space is greater than 85%, and the associated capacity update action rule 1541c specifies the action to expand space. Similarly, the second capacity update rule group 1542 includes a second capacity update target context 1542a, a second capacity update threshold condition 1542b, and a second capacity update action rule 1542c. The second capacity update target context 1542a targets all file systems. The second capacity update threshold condition 1542b triggers if the used space is greater than 80%. The associated capacity update action rule 1542c specifies the action to notify.

The file data update policy segment 1550 of the actions screen 1530 may include two rule groups, i.e. a first file data update rule group 1551 and a second file data update rule group 1552. The first file data update rule group 1551 includes a first file data update target context 1551a, a first data update threshold context 1551b, and two associated first file data update action rules, e.g., an initial associated first file data update action rule 1551c1 and a latter associated first file update action rule 1551c2. The first file data update target context 1551a targets all file systems, the first file data update threshold condition 1551b triggers if the used space is greater than 80%. The initial associated first file data update action rule 1551c1 specifies the action to delete files according to directory and file attribute filters that limit the delete action to image files, JPG, JPEG, GIF, BMP, PNG, TIF, TIFF, PIC, PICT files not accessed within the last six months, as well as TMP files not accessed in the last 2 days, all such file being located in the /tmp, /usr/tmp, and /Temp Files directories. The latter associated first file data update action rule 1551c2 specifies the action to archive files according to directory and file attribute filters that limit the archive action to DOC and PDF files not accessed in the last 2 months and bigger than 25 MB, all such files being located in any directory.

The second file data update rule group 1552 may include a second file data update target context 1552a, an second file data update threshold condition 1552b, and an associated second file data update action rule 1552c. The second file data update target context 1552a targets file systems D and E. The second file data update threshold condition 1552b triggers upon any condition. The associated second file data update action rule 1552c specifies the action to archive files according to the directory and file attribute filters that limit the archive action to all files not accessed in the last 2 months which are bigger than 25 MB and are located in any directory.

It will be appreciated that the actions sets, the capacity update and the file data update policy segments, and/or the action rule groups and actions rules contained therein, may be modified and/or expanded to produce a multitude of varied actions, targets, and conditions.

Figure 16A:
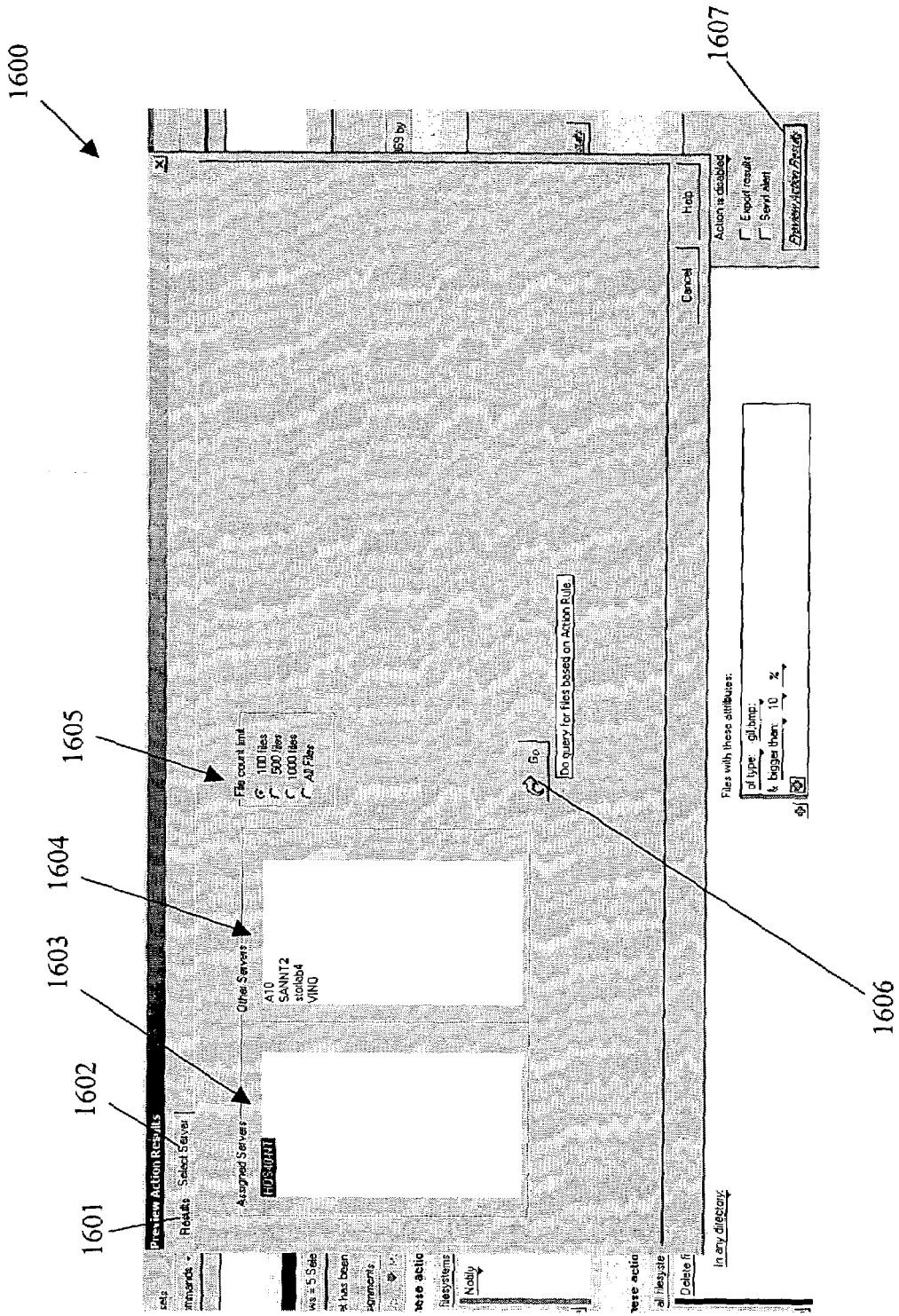
FIG. 16a illustrates an example preview action results modal popup window, according to an example embodiment of the present invention.

FIG. 16a illustrates an example preview action results modal popup window 1600, according to an example embodiment of the present invention. The preview action results modal popup window 1600 may be displayed upon selection of the select server tab 1602 following the selection of the preview action results button 1607. Two lists may be displayed, e.g., the assigned servers list 1603 and the other servers list 1604. Upon selecting a server, choosing a file count limit 1605 and clicking the go button 1606 a query is made of the files that would be acted upon if the action was actually executed.

Figure 16B:
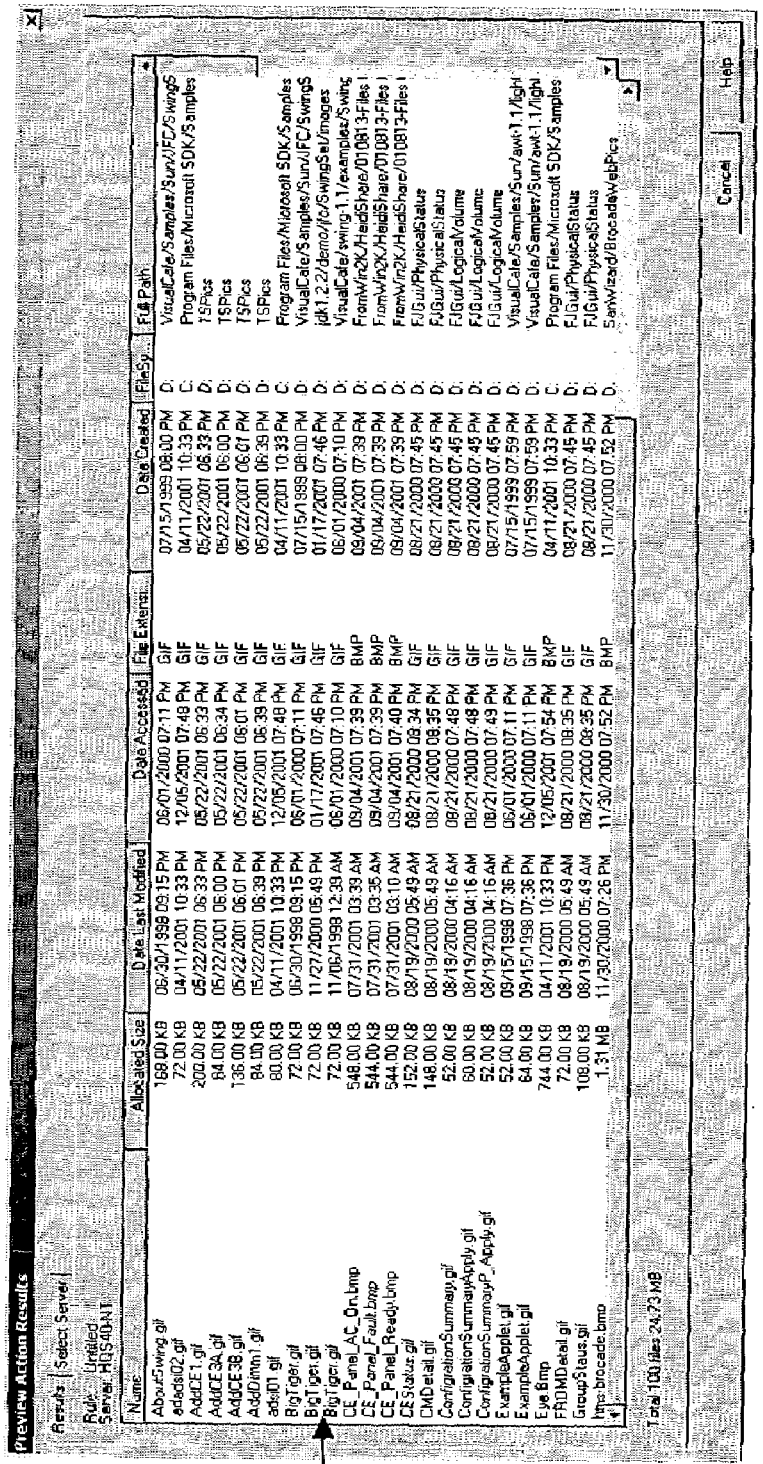
FIG. 16b illustrates an example preview action results modal popup window, according to an example embodiment of the present invention.

FIG. 16b illustrates an example preview action results modal popup window 1620, according to an example embodiment of the present invention. The previous action results modal popup window may be displayed upon selection of the results tab 1601 following selection of the preview action results button 1607. A list of effected files 1621 is displayed along with file attributes.

FIG. 17 shows an example policy 1700 for managing disk space of a server and alerting the system administrator upon exceeding a threshold of disk usage. Policy 1700 includes a context that targets the server "AdminServer", a threshold condition that triggers upon exceeding a disk usage of 75%, and an action that sends an email alert to the system administrator of the server. If policy 1700 were enabled, the storage management system may schedule a collection of the disk usage data via the space agent resident on the AdminServer and send an email alert to listed administrator for this server. The policy 1700 may be stored, for example, in a policy database to be later retrieved by the storage management system server application and/or the user interface.

FIG. 18 shows an example policy 1800 for archiving and erasing all files located on a named file server that are larger than a certain size and not accessed within a certain time period. Policy 1800 includes a context of the file server named "Titan", a threshold condition that triggers upon encountering a file greater than 10,000 bytes and not accessed with the last year, and two actions that archive and then subsequently delete the file. If policy 1800 were enabled, the storage management system may schedule a collection of the file data via the space agent resident on the Titan server and then archive and delete those files on the Titan server that meet the condition criteria of being larger than 10,000 bytes and not accessed with the last year an email alert to listed administrator for this server. The policy 1800 may be stored for example, in a policy database to be later retrieved by the storage management system application server and/or the user interface.

FIG. 19 shows an example policy 1900 for deleting files of a certain type on file systems with less than a certain amount of disk space left. Policy 1900 includes a context of all file systems with less than 20% free disk space, a threshold condition that triggers upon encountering a file with a "jpg" extension, and an action of deleting the file. If policy 1900 were enabled, the storage management system may schedule a collection of the file system data via the space agents of all servers and then deleting any file with the jog extension. The policy 1900 may be stored for example, in a policy database to be later retrieved by the storage management system application server and/or the user interface.

Figure 20:
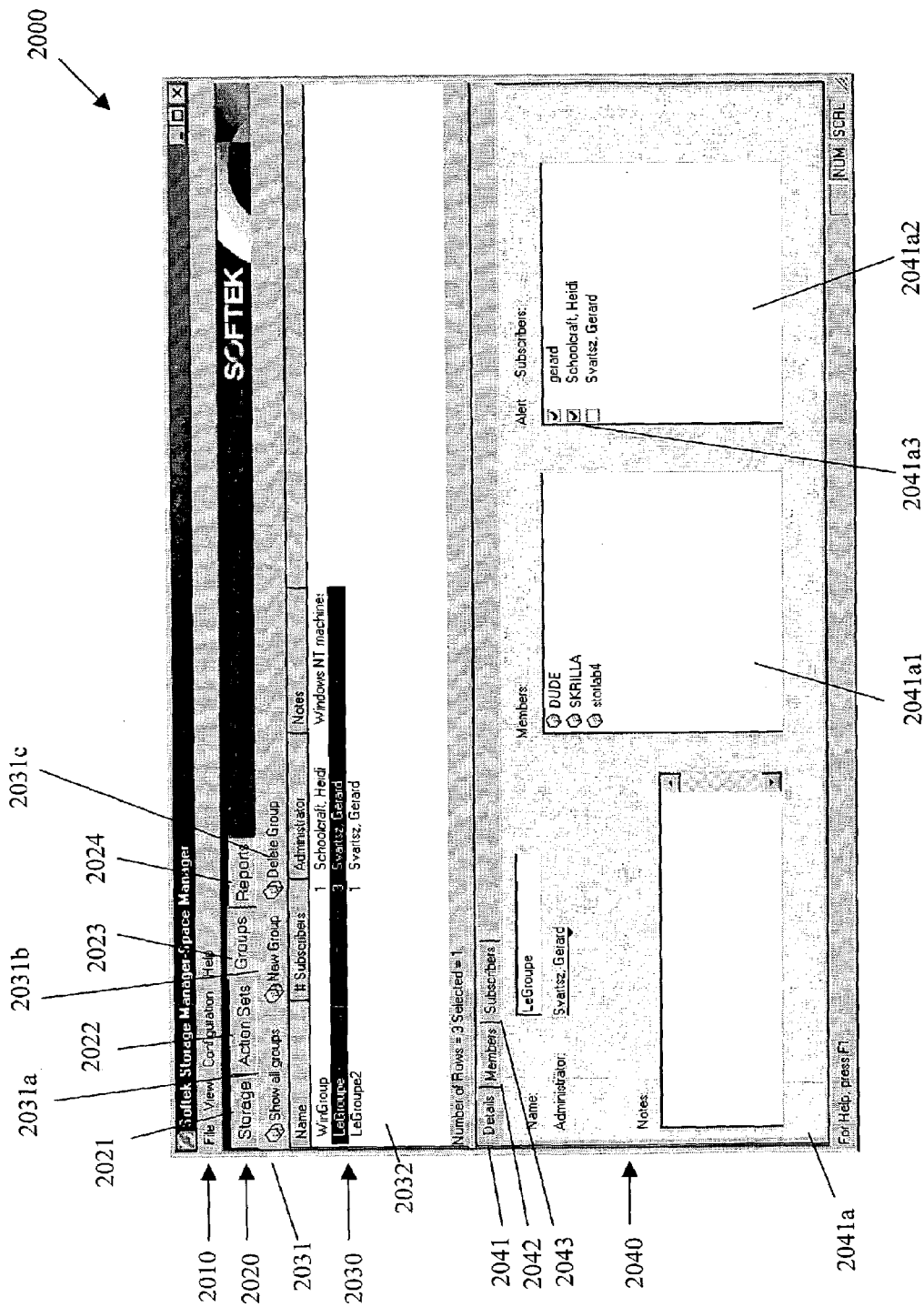
FIG. 20 illustrates an example storage management screen according to an example embodiment of the present invention.

FIG. 20 illustrates an example storage management screen 2000 according to an example embodiment of the present invention. Storage management screen 2000 may include a menu bar 2010 and four tabs 2020. The four tabs 2020 may include a storage tab 2021, an action sets tab 2022, a groups tab 2023, and a reports tab 2024. The storage tab 2021 corresponds to a storage pane displaying storage management information. The action set tab 2022 corresponds to an action sets pane displaying information facilitating selection of actions to be performed. The groups tab 2023 corresponds to a group displaying information facilitating the creation of object groups, the reports tab 2024 corresponds to an alter pan displaying a user notification when a predetermined condition occurs regarding one or more of the storage objects. It will be appreciated that other arrangements and interface types may be provided.

The storage management screen 2000 is shown in FIG. 20 with the groups tab 2020 selected. The groups tab 2020 may be configured to allow a user to define, view, sort, and modify groups of storage objects. For example, groups may be defined for servers, file systems, directories, files, and applications. An application group, for example, may be defined as a set of file systems, directories, or files on one or more servers. Groups may be defined dynamically or statically. A dynamic group may be defined using filters that determine the characteristics a member of the group. The filters may be evaluated dynamically to determine which storage objects meet the filter criteria at a specific instant of time, which may be useful in performing actions. A static group may contain explicitly defined members so that the group members do not change over time. Both dynamic and static groups may simplify the tasks of alerting, reporting, and managing action sets.

Upon selection of the groups tab 2023, a group visualizer area 2030 and a group detailer area 2040 is displayed in the storage management display 2000. The group visualizer area 2030 may include a group command line 2031 and a group display area 2032. The group command line may include a show button 2031a to display information about groups, a new group button 2031b to create new groups, and a delete group button 2031c to remove groups. The group display area 2032 may displays group information including their group name, the number of subscribers to the group, an administrator for the group, and notes regarding the group. It will also be appreciated that the group display area 2032 may include both textual and graphical formats. For example, the group display area 2032 may also display group information in a "tree-like" structure. It will also be appreciated that the group command line 2031 may be incorporated into the group display area 2032, enabling a user, for example, to traverse the tree-like structure, "pruning" and/or "extending" it.

Upon selection of a group in the group display area 2032, further information regarding the selected group is displayed in the group detailer area 2040. The group detailer area 2040 may include a details tab 2041, a members tab 2042, and a subscribers tab 2043. The details tab 2041 may correspond to a details pane 2041a displaying information regarding group settings, the members tab 2042 corresponds to a members pane 2042a displaying information facilitating the selection of group members, and the subscribers tab 2043 corresponds to a subscribers pane 2043a corresponding to information facilitating the selection of subscribers to the group.

The group detailer 2040 is shown in FIG. 20 with the details tab 2041 selected displaying the details pane 2041a. The details pane 2041 may include a members box 2041a1 and a subscribers box 2041a2. The members box 2041a1 displays a list of the members of the selected group. The subscribers box 2041a2 displays a list of subscribers and a corresponding alert box 2041a3 for each subscriber indicating whether an alert should be sent to them. The alert box 2041a3 may be toggled between "check" and "uncheck" by clicking on it. It will be appreciated that the display of members and subscribers in the member box 2041a1 and the subscriber box 2041a2 may be shown in both a textual and graphical format.

Figure 21:
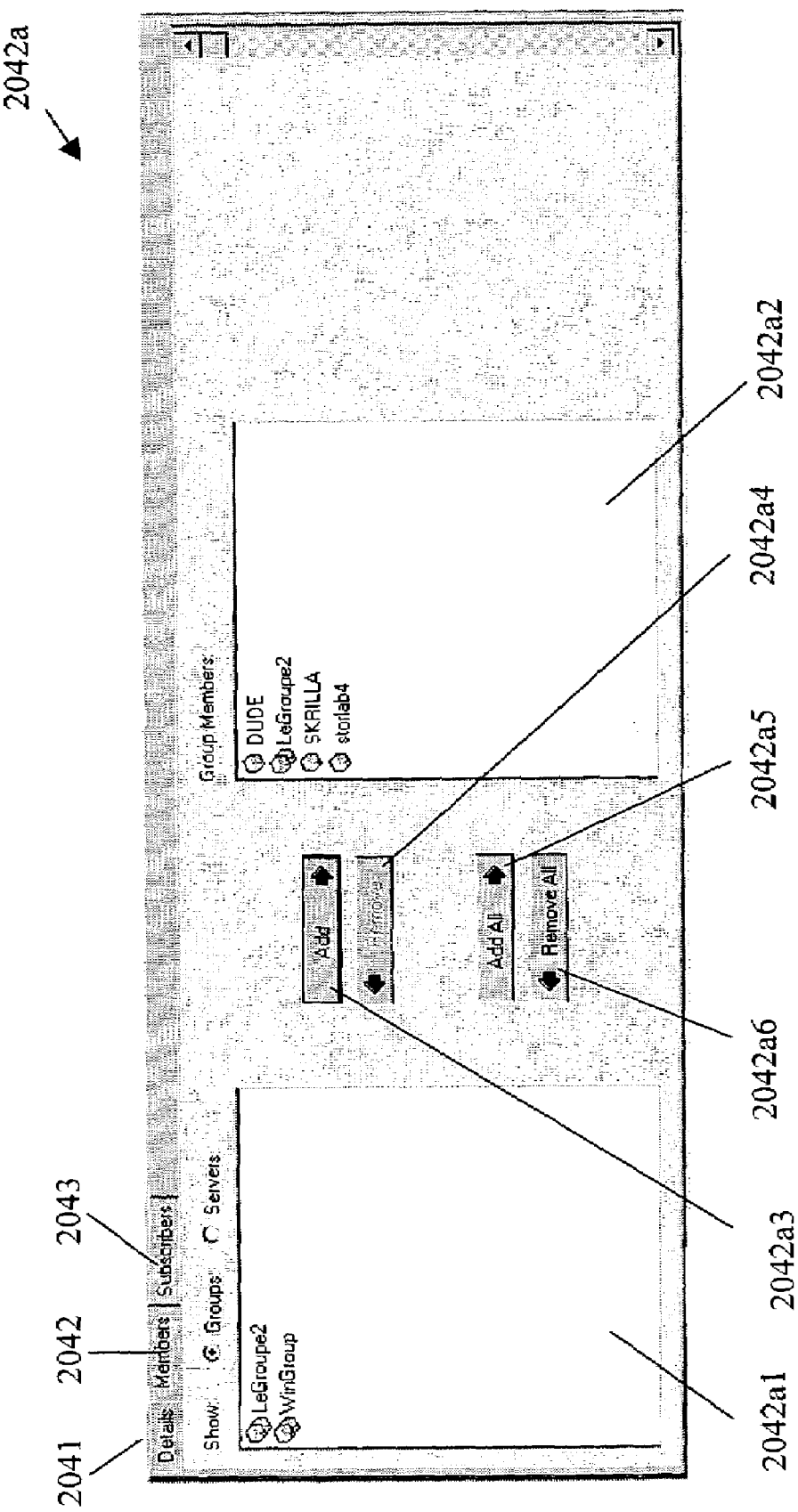
FIG. 21 shows an example members pane of the detailer area of the storage management screen of FIG. 20.

FIG. 21 shows an example members pane 2042a of the detailer area 2040 of the storage management display 2000 of FIG. 20. The members pane 2042a may include a group or server box 2042a1 displaying a list of groups/servers. The members pane 2042a may also include a group members box 2042a2 displaying a list of group members. The members pane 2042a may also include an add button 2042a3 to add a group or server to the list of group members. The members pane 2042a may also include a remove button 2042a4 to remove a group or server from the list of group members, an add all button 2042a5 to add all groups/servers to the list of group members, and a remove all button 2042a6 to remove all groups/servers from the list of group members. It will be appreciated that the displays of the group or server box 2042a1 and the group members box 2042a2 may include a textual and/or graphical format.

Figure 22:
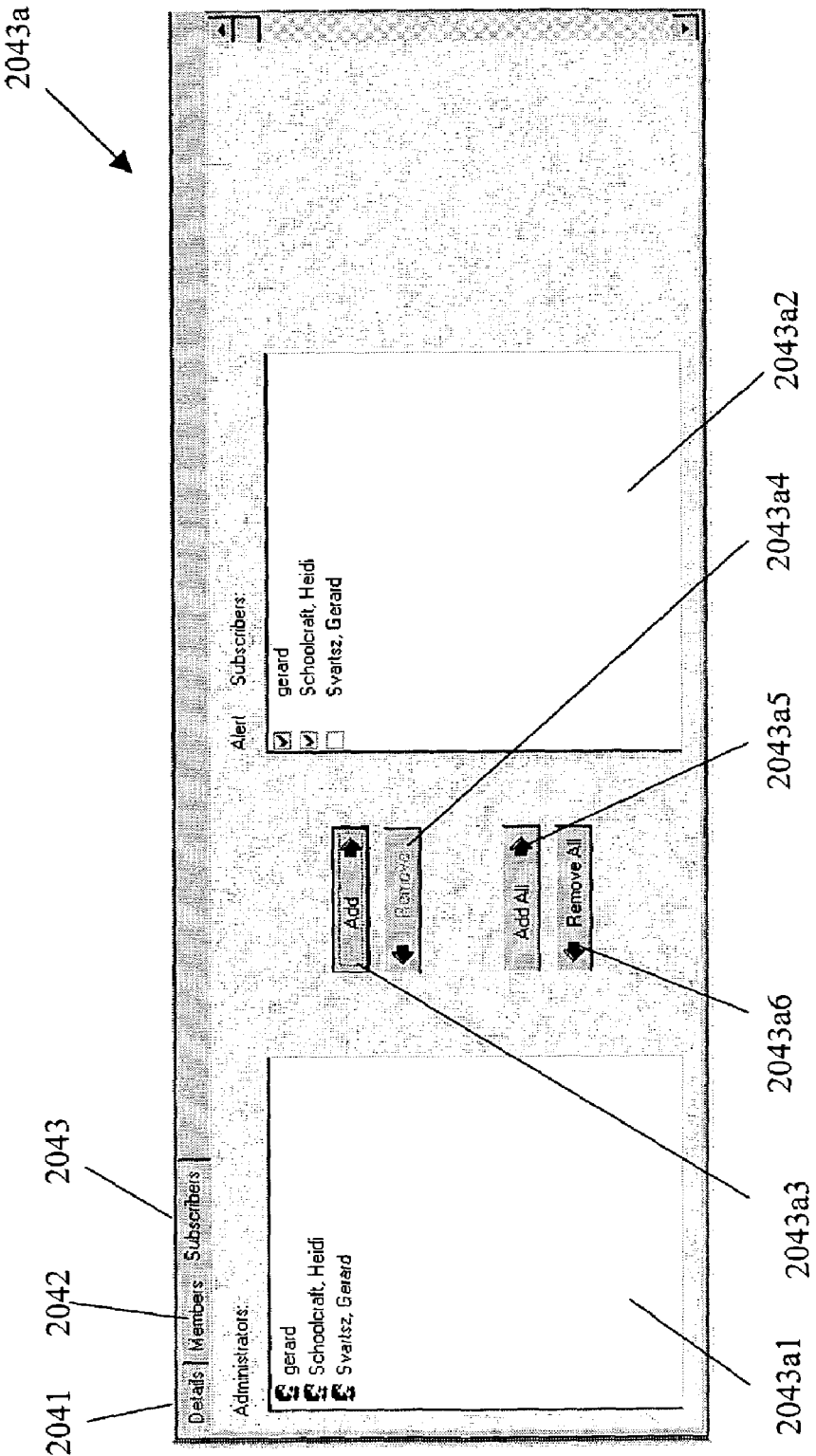
FIG. 22 shows an example subscriber pane of the detailer area of the storage management screen of FIG. 20.

FIG. 22 shows an example subscriber pane 2043a of the detailer area 2040 of the storage management display 2000 of the FIG. 20. The subscribers pane 2043a may include a group or server box 2043a1 displaying a list of groups/servers. The subscribers pane 2043a may also include a group subscribers box 2043a2 displaying a list of subscribers, an add button 2043a3 to add a group or server to the list of subscribers. The subscribers pane 2043a may also include a remove button 2043a4 to remove a group or server from the list of subscribers, an add all button 2043a5 to add all groups/servers to the list of subscribers, and a remove all button 2043a6 to remove all groups/servers from the list of subscribers. It will be appreciated that the displays of the group or server box 2043a1 and the subscribers box 2043a2 may include a textual and/or graphical format.

Figure 23:
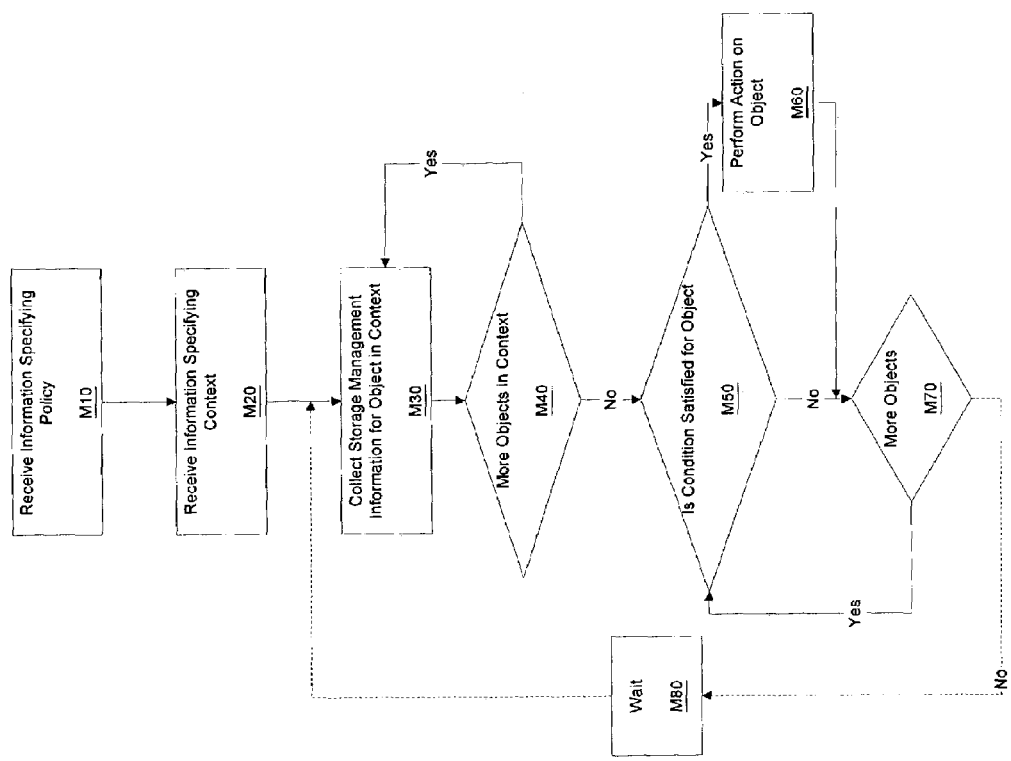
FIG. 23 illustrates an example procedure for managing storage objects, according to an example embodiment of the present invention.

FIG. 23 illustrates an example procedure for managing storage objects, according to an example embodiment of the present invention. In M10, information specifying a storage management policy may be received. This policy information may be received from a graphical user interface (e.g., by direct user interface), looked up from a policy database, be specified as a rule in a query language, be generated by an administration tool, or may be selected as a default. The example policy may associate a target storage object, a condition, and an action rule. For example the rule may be for a file system, the condition may be the file system being over a threshold capacity, and the action may be deleting all files of a prespecified type on the file system. It will be appreciated that a policy may also include multiple actions.

In M20, information specifying a context for applying the policy received in M10 may be received, e.g., from a graphical user interface or an administration tool. The context may list all of the storage objects to which the policy is applied. For example, if the policy applies to file systems, the context may be a list of file server where the policy is to be applied to all file systems on the listed file servers.

In M30, storage management information may be collected for a storage object in the context. For example, if the storage object is a file system, the storage management information may be the capacity and usage of the file system.

In M40, if there are more objects in the context, the example procedure may repeat M30. Otherwise, the example procedure may continue with M50.

In M50, whether a storage object satisfies the condition may be determined. This may be accomplished by evaluating the storage management information collected in M30. For example, if the storage object is a file system, and the condition is whether the file system usage exceeds a threshold capacity, the condition with be satisfied if the collected information on the file system indicates that the file system exceeds the designated threshold capacity. If the condition is satisfied the example procedure may continue with M60. Otherwise the example procedure may continue with M70.

In M60, the action specified in the policy may be performed on the storage object. For example, if the storage object is a file system, and the condition is exceeding a threshold capacity, the action may be to delete all files of a certain type on the file system. Once the action has been completed, the action may be logged. The example procedure may continue with M70.

In M70, whether there are more storage objects in the context for which storage management information has been collected may be determined. If there are more objects, the example procedure may continue by repeating M50 for another object. Otherwise the example procedure may continue with M80.

In M80, the example procedure may wait until the next time storage management information is to be collected. This may be specified as part of the policy, may occur on a regular periodic event, or may be event driven. When storage management information is to be collected for storage objects in the context, the example procedure may continue with M30.

The example procedure may continue indefinitely until the policy is disabled, deleted, or modified.

It will be appreciated that other steps may be included in the example procedure, and that the order of the steps of the example procedure may be rearranged. For example, each storage object in the context may have the policy applied to it before information is collected for the next storage object in the context; or a user input may be received specifying a context for the policy and the policy may be applied to all storage objects in the context; or storage management information may be displayed for a first storage object; or a user request may be received to perform a manual action on the first storage object and the manual action may be on the first storage object in response to the user request; or freshness information may be displayed indicating how recently the storage management information for the first storage object has been updated; or a user request may be received to update the storage management information for the first storage object and the storage management information may be updated for the first storage object in response to the user request; or a user indication of a first action to be performed on the first storage object may be received and the effect of the first action on the first storage object may be previewed.

It will also be appreciated that other storage management activities may be conducted in parallel with the example procedure, provided concurrency control is handled either by an underlying system, or by a storage management system.

It will also be appreciated that an article of manufacture having a computer-readable medium may provided, e.g., the article of manufacture may have stored thereon instructions adapted to be executed by a processor, the instruction which, when executed will control the carrying out the example procedure for managing storage objects.

Figure 24:
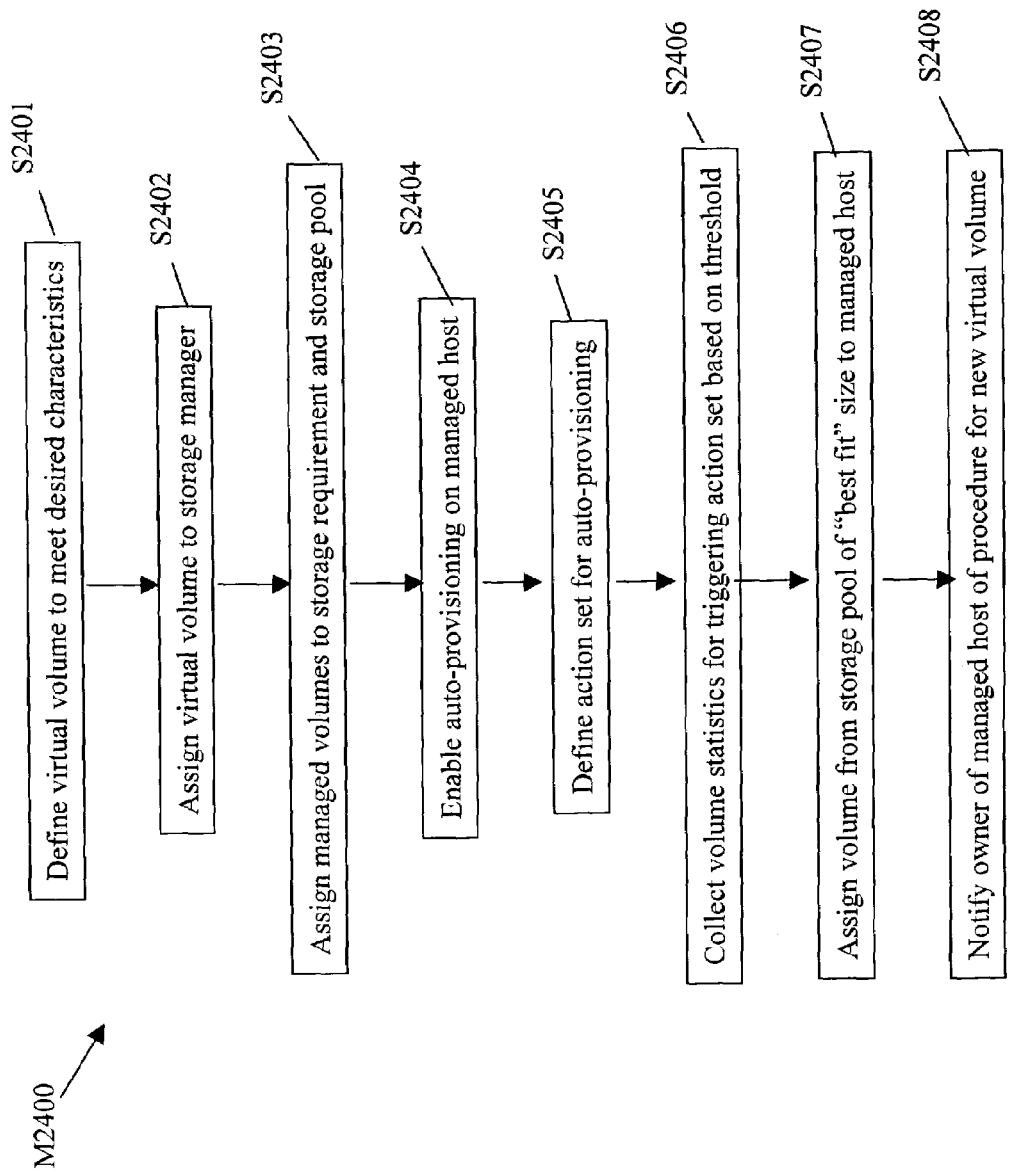
FIG. 24 illustrates an example procedure for automatic provisioning.

FIG. 24 shows an example method M2400 for automatic storage provisioning. In step S24101, a virtual volume is defined, for example, by a storage administrator, to meet desired characteristics, such as, for example, a size, a mirrored element, an alternate path(s), etc. In step S2402, the virtual volume is assigned, for example, by the storage administrator, to a store manager. In step S2403, the virtual volume is assigned to a particular storage requirement and/or storage pool of the storage manager. In step S2404, auto-provisioning is enabled on the managed host, for example, by the storage administrator, via for example, the storage manager GUI. In step S2405, an action set is defined for auto-provisioning, which may include, for example, a usage threshold or provision size. In step S2406, volume statistics are collected, for example, by the storage manager, for triggering action set(s) based on, for example, a threshold. In step S2407, volume(s) from the storage pool of "best fit" size are assigned to the managed host. In step S2408, the owner of the managed host is notified of the procedure(s) for the new virtual volume.

MODIFICATIONS

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. A storage management system, comprising:
a data collector configured to receive storage management information for a plurality of storage objects;
an agent configured to collect storage management information for a first storage object of the plurality of storage objects, and to communicate the storage management information for the first storage object to the data collector;
a user interface configured to display the storage management information for the plurality of storage objects; and
an action set engine to interrogate the storage management information and to execute, based on the interrogation, an automatable action.

2. The storage management system of claim 1, wherein the agent is configured to collect the storage management information for the first storage object and communicate the storage management information for the first storage object to the data collector at a predetermined set of periodic times.

3. The storage management system of claim 2, wherein the user interface is further configured to allow a user to specify the predetermined set of periodic times.

4. The storage management system of claim 1, wherein the user interface is further configured to allow a user to request a real-time update of the storage management information for the first storage object, and the agent is further configured to collect fresh storage management information for the first storage object and communicate the fresh storage management information to the data collector, upon a request by the user for the real-time update of the storage management information for the first storage object.

5. The storage management system of claim 1, wherein the first storage object is a server.

6. The storage management system of claim 1, wherein the first storage object is a file system.

7. The storage management system of claim 6, wherein the storage management information for the first storage object includes the amount of file space used in the file system.

8. The storage management system of claim 6, wherein the storage management information for the first storage object includes the size of the file system.

9. The storage management system of claim 1, wherein the first storage object is a file.

10. The storage management system of claim 9, wherein the storage management information for the first storage object includes the size of the file.

11. The storage management system of claim 9, wherein the storage management information for the first storage object includes the time the file was last accessed.

12. The storage management system of claim 9, wherein the storage management information for the first storage object includes the file type.

13. The storage management system of claim 1, wherein the user interface is further configured to allow the user to choose between graphical and numeric displays of the storage management information.

14. The storage management system of claim 1, wherein the user interface further includes a freshness indicator.

15. The storage management system of claim 14, wherein the freshness indicator is configured to provide a graphical indication of an elapsed time since the storage management information was collected.

16. The storage management system of claim 15, wherein the user interface is further configured to display a collection time associated with the storage management information.

17. The storage management system of claim 1, wherein the user interface further includes a filter, the filter configured to selectively display a subset of the storage management information regarding the plurality of storage objects, the subset of the storage management information regarding the plurality of storage objects selected according to a predefined selection criterion.

18. The storage management system of claim 17, wherein the filter is configured to allow a user to select the predefined selection criterion from a menu of options.

19. The storage management system of claim 17, wherein the predefined selection criterion is whether a file system exceeds a threshold percentage of capacity.

20. The storage management system of claim 17, wherein the predefined selection criterion is whether a file exceeds a threshold size.

21. The storage management system of claim 1, wherein the user interface further includes a sort configured to reorder the storage management information regarding the plurality of storage objects according to a predefined ordering criterion.

22. The storage management system of claim 21, wherein the sort is configured to allow a user to select the predefined ordering criterion from a menu of options.

23. The storage management system of claim 21, wherein the predefined ordering criterion is the time since the most recent use of a file.

24. The storage management system of claim 1, wherein the agent is configured to perform an action upon the storage object.

25. The storage management system of claim 24, wherein the action is deleting the storage object.

26. The storage management system of claim 24, wherein the action is archiving the storage object.

27. The storage management system of claim 24, wherein the action is backing-up the storage object.

28. The storage management system of claim 24, wherein the action is compressing a storage object.

29. The storage management system of claim 24, wherein the action is changing an attribute of a storage object.

30. The storage management system of claim 29, wherein the attribute of the storage object includes a size.

31. The storage management system of claim 29, wherein the attribute of the storage object includes a type.

32. The storage management system of claim 24, wherein the user interface further includes an action input interface, the action input interface configured to allow a user to specify an action.

33. The storage management system of claim 24, wherein the user interface further includes a previewer configured to allow the user to view the effect of the action without having the effects of the action take place.

34. The storage management system of claim 1, wherein the user interface further includes a policy input interface, the policy input interface configured to allow the user to select a policy, the policy associating a target, a condition, and an action.

35. The storage management system of claim 1, further comprising:
   a policy database, the policy database containing a plurality of policy entries, each entry including information identifying a respective target, a respective condition, and a respective action.

36. The storage management system of claim 34, wherein the agent is configured to perform the action on the storage object, if the policy is activated and the storage object is the target and the condition is satisfied.

37. The storage management system of claim 36, wherein the condition is a periodic event.

38. The storage management system of claim 36, wherein the storage object is a file, and the condition is the file being of a predetermined type and exceeding a predetermined age threshold.

39. The storage management system of claim 36, wherein the storage object is a file, and the condition is the file being of a predetermined type and exceeding a predetermined size threshold.

40. The storage management system of claim 34, wherein the user interface further includes a previewer, the previewer configured to preview and allow the user to view the effect of a policy without having the effect of the policy take place.

41. The storage management system of claim 40, wherein the previewer is further configured to generate a log.

42. The storage management system of claim 41, wherein the log includes a list of files affected by the action of the policy.

43. The storage management system of claim 34, wherein the user interface includes a context selection interface configured to allow the user to select a context, and wherein the agent is configured to apply the policy to all storage objects of a selected type in the context.

44. The storage management system of claim 43, wherein the context is a named file system.

45. The storage management system of claim 43, wherein the context is all file systems except a named file system.

46. The storage management system of claim 43, wherein the context is all files systems with free space less than a threshold amount.

47. The storage management system of claim 32, wherein the user interface is configured to allow a user to specify a user-selected group of action rules to be applied to a user-selected group of file systems.

48. The storage management system of claim 47, wherein the action rules include a file filter.

49. The storage management system of claim 1, wherein the user interface is configured to accept a user command to perform a manual action on the storage object.

50. The storage management system of claim 49, wherein the manual action includes a manual refresh action to update storage management information for the storage object.

51. The storage management system of claim 50, wherein the manual refresh action includes refresh choices, the refresh choices including an entire list refresh, a selected items refresh, and an entire system refresh.

52. A storage management system, comprising:
 a data collector configured to receive storage management information for a plurality of file systems;
 an agent configured to:
  collect storage management information for a first file system of the plurality of file systems;
  communicate the storage management information for the first file system to the data collector at a predetermined set of periodic times;
  collect fresh storage management information for the first file system and communicate the fresh storage management information to the data collector, upon a request by a user for the real-time update of the storage management information for the first file system; and
  perform an action upon the first file system, the action including at least one of backing-up, deleting, compressing, and archiving the first file system; and
 a user interface configured to display the storage management information for the plurality of file systems, wherein:
  the user interface includes:
   a policy input interface, the policy input interface configured to allow the user to select a policy, the policy associating a target, a condition, and an action;
   an action input interface, the action input interface configured to allow the user to specify an action;
   a filter, the filter configured to selectively display a subset of the storage management information regarding the plurality file systems; and
   a previewer configured to allow the user to view the effect of the action without having the effect of the action take place; and the user interface is further configured:
    to allow the user to choose between graphical and numeric displays of the storage management information;
    to allow the user to specify the predetermined set of periodic times;
    to allow the user to request a real-time update of the storage management information for the first file system; and
    to display a collection time associated with the storage management information.

53. A storage management system, comprising:
 a data collector;
 an agent configured to:
  collect storage management information for a storage object at times defined in a collection schedule that defines at least one of (a) one or more times and (b) one or more conditions for the collection;
  communicate the storage management information to the data collector; and
  in response to receipt from the data collector of a command to perform on the storage object, execute the command;
 a user interface configured to:
  display the storage management information received by the data collector from the agent;
  allow a user to at least one of input, view, select, and modify a policy set and an action set;
 a memory configured to store the policy set and the action set; and
 an action set engine configured to automatically interrogate the storage management information received by the data collector from the agent and to execute an action based on (a) the interrogation, (b) the stored action set, and (c) the stored policy set, wherein the action includes recording the command for the data collector to transmit to the agent.

* * * * *